(12) United States Patent
Bai et al.

(10) Patent No.: US 12,625,981 B2
(45) Date of Patent: May 12, 2026

(54) PRIVACY PRESERVING CROSS-DOMAIN MACHINE LEARNING

(71) Applicant: Google LLC, Mountain View, CA (US)

(72) Inventors: Yijian Bai, San Ramon, CA (US); Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 1111 days.

(21) Appl. No.: 17/638,943

(22) PCT Filed: Mar. 19, 2021

(86) PCT No.: PCT/US2021/023102
§ 371 (c)(1),
(2) Date: Feb. 28, 2022

(87) PCT Pub. No.: WO2022/197304
PCT Pub. Date: Sep. 22, 2022

(65) Prior Publication Data
US 2022/0405407 A1 Dec. 22, 2022

(51) Int. Cl.
*G06N 20/00* (2019.01)
*G06F 21/60* (2013.01)

(52) U.S. Cl.
CPC ........... *G06F 21/606* (2013.01); *G06N 20/00* (2019.01)

(58) Field of Classification Search
CPC .............................. G06F 21/606; G06N 20/00
See application file for complete search history.

(56) References Cited

U.S. PATENT DOCUMENTS 10,790,056 B1 * 9/2020 Accomazzi ............ G06N 3/084
2018/0285774 A1 * 10/2018 Soni ........................ G06Q 50/01
(Continued)

FOREIGN PATENT DOCUMENTS

CN 111095330 5/2020
CN 112000990 11/2020
(Continued)

OTHER PUBLICATIONS

Grbovic, Mihajlo, Vladan Radosavljevic, Nemanja Djuric, Narayan Bhamidipati, Jaikit Savla, Varun Bhagwan, and Doug Sharp. "E-commerce in your inbox: Product recommendations at scale." In Proceedings of the 21th ACM SIGKDD international conference on knowledge discovery and data mining, pp. 1809-1818 (Year: 2015).*
(Continued)

*Primary Examiner* — Kamran Afshar
*Assistant Examiner* — Simon Fischer Ellis
(74) *Attorney, Agent, or Firm* — Fish & Richardson P.C.

(57) ABSTRACT

This document describes a secure machine learning platform. In some aspects, a method includes transmitting by the application to the machine learning platform, a set of data including a user profile, one or more characteristics of a digital component, contextual signals, model identifier, and data indicating a type of event. The application receives a request generated based on the computer-readable instructions to upload a user profile of a user of the client device to a machine learning platform. The computer-readable instructions initiate the request in response to detecting an occurrence of the event with the digital component. In response to the request, the application can obtain the user profile request data element that includes a model identifier for a machine learning model and one or more characteristics of at least one of the digital component or the first content page.

20 Claims, 6 Drawing Sheets

(56)  References Cited

U.S. PATENT DOCUMENTS

| | | | |
|---|---|---|---|
| 2020/0005180 A1 | 1/2020 | Fritchman et al. | |
| 2020/0364746 A1* | 11/2020 | Longano ................ | G06N 20/00 |
| 2020/0372394 A1 | 11/2020 | Kulkarni et al. | |
| 2021/0097894 A1* | 4/2021 | Iyer ........................ | G06N 20/00 |
| 2022/0067574 A1* | 3/2022 | Barnes ..................... | G06N 3/04 |

FOREIGN PATENT DOCUMENTS

| | | |
|---|---|---|
| CN | 112182399 | 1/2021 |
| WO | WO 2018/174873 | 9/2018 |
| WO | WO 2020/205010 | 10/2020 |
| WO | WO 2021025731 | 2/2021 |

OTHER PUBLICATIONS

Wagh, Sameer, Divya Gupta, and Nishanth Chandran. "Securenn: Efficient and private neural network training." Cryptology ePrint Archive (2018). (Year: 2018).*

International Search Report and Written Opinion in International Appln. No. PCT/US2021/023102, dated Dec. 8, 2021, 17 pages.

Office Action in Chinese Appln. No. 202180005537.5, mailed on Aug. 1, 2025, 22 pages (with English translation).

Office Action in Indian Appln. No. 202227011268, mailed on Mar. 27, 2025, 7 pages (with English translation).

International Preliminary Report on Patentability in International Appln. No. PCT/US2021/023102, mailed on Sep. 28, 2023, 11 pages.

Office Action in European Appln. No. 21718356.5, dated Sep. 21, 2022, 7 pages.

* cited by examiner

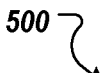

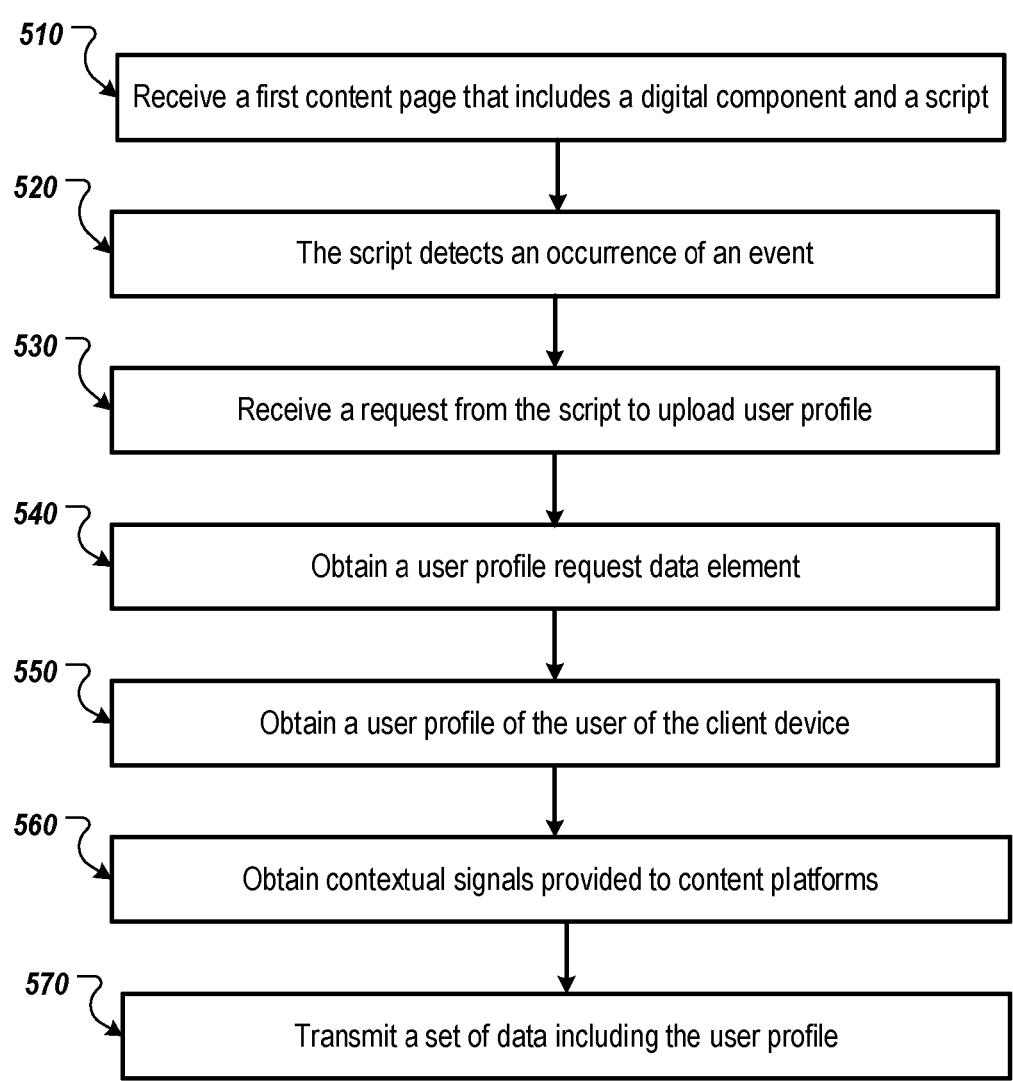

*500*

*510*   Receive a first content page that includes a digital component and a script

*520*   The script detects an occurrence of an event

*530*   Receive a request from the script to upload user profile

*540*   Obtain a user profile request data element

*550*   Obtain a user profile of the user of the client device

*560*   Obtain contextual signals provided to content platforms

*570*   Transmit a set of data including the user profile

FIG. 5

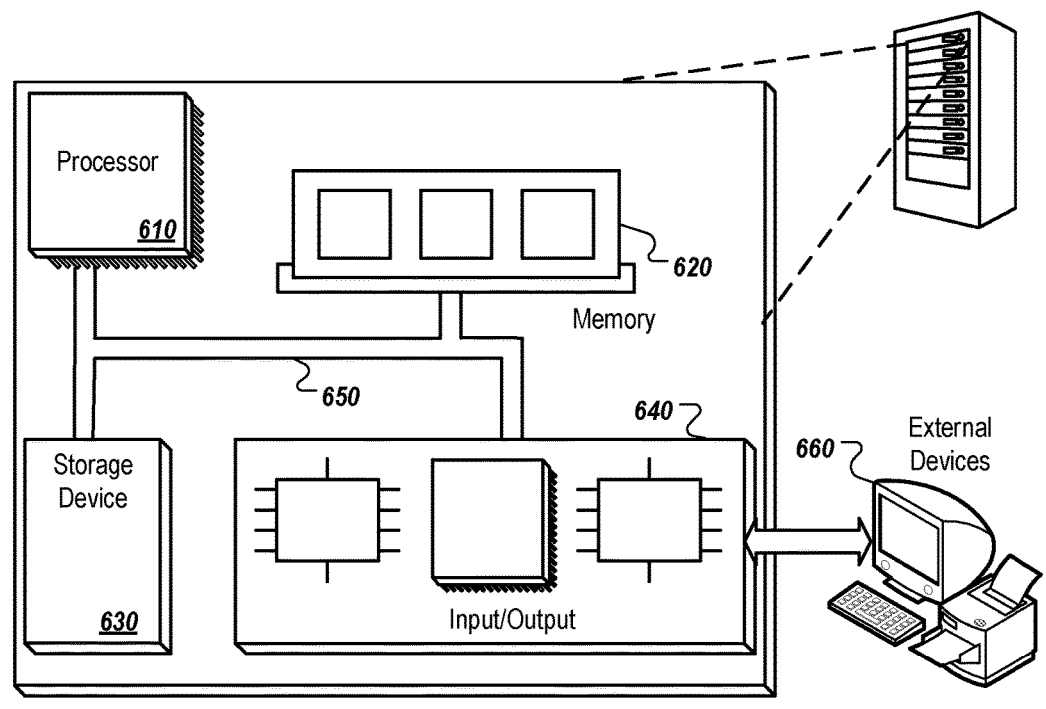
FIG. 6

PRIVACY PRESERVING CROSS-DOMAIN MACHINE LEARNING

CROSS-REFERENCE TO RELATED APPLICATIONS

This application is a National Stage Application under 35 U.S.C. § 371 and claims the benefit of International Application No. PCT/US2021/023102, filed Mar. 19, 2021. The disclosure of the foregoing application is incorporated herein by reference in its entirety.

TECHNICAL FIELD

This specification relates to a privacy preserving machine learning platform that trains and uses machine learning models using secure multi-party computation.

BACKGROUND

Some machine learning models are trained based on data collected from multiple sources, e.g., across multiple websites and/or native applications. However, this data can include private or sensitive data that should not be shared or allowed to leak to other parties.

SUMMARY

In general, one innovative aspect of the subject matter described in this specification can be embodied in methods that include the operations of receiving, by a client device, a first content page including a digital component that includes computer-readable instructions; receiving, by an application running on the client device, a request generated based on the computer-readable instructions to upload a user profile of a user of the client device to a machine learning platform, where the computer-readable instructions initiate the request in response to detecting an occurrence of an event related to interaction or non-interaction with the digital component; in response to receiving the request: obtaining, by the application, a user profile request data element including a model identifier for a machine learning model and one or more characteristics of at least one of the digital component or the first content page; obtaining, by the application, a user profile for a user of the client device; obtaining, by the application, contextual signals provided to one or more content platforms for use in training the machine learning model; and transmitting, by the application and to the machine learning platform, a set of data including the user profile, the one or more characteristics , the contextual signals, the model identifier, and data indicating whether the event is an interaction event or a non-interaction event.

Other implementations of this aspect include corresponding apparatus, systems, and computer programs, configured to perform the aspects of the methods, encoded on computer storage devices. These and other implementations can each optionally include one or more of the following features.

Some aspects include verifying by the application, the digital signature prior to transmitting the set of data to the machine learning platform.

Some aspects include accessing, in response to detecting the occurrence of the interaction event, by the client device, a second content page provided by a second content provider different from a first content provider that provided the first content page, where the second content page includes a tag that includes computer-readable code; receiving, from the tag, a request for the contextual signals, the one or more characteristics of the digital component and the user profile; encrypting, by the application, the contextual signals, the one or more characteristics of the digital component and the user profile; and transmitting, to a content platform that provided the digital component, the encrypted contextual signals, the encrypted one or more characteristics of the digital component, and the encrypted user profile.

Some aspects include detecting, by the computer-readable code of the tag, a conversion event and transmitting, by the computer-readable code of the tag, a conversion notification for the conversion event to the content platform.

Some aspects include for each of one or more digital components: sending, by the application, an inference request for the digital component to the machine learning platform, where the inference request includes one or more of the user profile, the contextual signals, or characteristics of the current content page; receiving, from the machine learning platform, a predicted performance for the digital component, where the predicted performance measures is based on the user profile and one or more trained machine learning models trained by the machine learning platform; determining, based on the predicted performance, a selection value for the digital component; and selecting a given digital component for display at the client device based at least on the selection value for each of the one or more digital components.

Some aspects include receiving, from a first multi-party computation (MPC) computer of the machine learning platform, a first secret share of an inference result for a first digital component; receiving, from each of one or more second MPC computers of the machine learning platform, a second secret share of the inference result for the digital component; determining, based on the first secret share and each second secret share, a predicted performance measure for the digital component represented by the inference result; selecting the digital component for display at the client device based on the predicted performance measure; and displaying the digital component.

In some aspects, the user profile request data element includes a token received from a content platform that provided the digital component. The token can include (i) a set of content including the model identifier, the data indicating the one or more characteristics, a domain of the content platform, and (ii) a digital signature of the set of content generated using an encryption key of the content platform.

The event can include an interaction event. The aspects can include, in response to detecting the occurrence of the interaction event, storing, at the client device, the contextual signals, the one or more characteristics of the digital component, and the user profile.

In some aspects, the inference request for the digital component to the machine learning platform can include the one or more characteristics of the digital component, the characteristics of the current context page and the contextual signals.

In some aspects, the predicted performance can be based on a performance of the digital component for k nearest neighbor profiles that are determined, based on the one or more machine learning models to be k most similar user profiles to the user profile for the user of the client device.

In some aspects, the predicted performance can include one of a predicted user interaction rate for the digital component or a predicted conversion rate, or a predicted conversion value for the digital component.

In some aspects, the machine learning platform can include two or more MPC computers that use a secure MPC process to train a machine learning model to predict a performance measure the digital component using the encrypted contextual signals, the encrypted one or more characteristics of the digital component, the encrypted user profile and data received from client devices of one or more additional users.

In some aspects the two or more MPC computers train the machine learning model without accessing the encrypted contextual signals, the encrypted one or more characteristics of the digital component, or the encrypted user profile in cleartext.

The subject matter described in this specification can be implemented in particular embodiments so as to realize one or more of the following advantages. The machine learning techniques described in this document can be used to select digital component for display to the user on the client device while preserving the privacy of users, e.g., without leaking users' online activity to any computing systems. This protects user privacy with respect to such platforms and preserves the security of the data from breaches during transmission to or from the platforms. Cryptographic techniques, such as secure MPC, enable better online user experience by selecting digital components based on the user profile, e.g., the user's online activity in a cross-domain environment, without the use of third-party cookies. As some browsers may not support third-party cookies, this enables functionality that may not otherwise be available for users.

The MPC techniques can ensure that, as long as one of the computing systems in an MPC cluster is honest and not compromised, no user data can be obtained by any of the computing systems of the MPC system or another party in cleartext. As such, the techniques described in this document allow the identification and transmission of user data in a secure manner, without requiring the use of third-party cookies, or any user identifiers, to determine any relations between user data. By using the trained machine learning models, the efficiency of transmitting data content to user devices is improved as data content that is not relevant to a particular user need not be transmitted. Particularly, third-party cookies are not required thereby avoiding the storage of third-party cookies, improving memory usage, and reducing the amount of bandwidth that would otherwise be consumed by transmitting the cookies.

Various features and advantages of the foregoing subject matter is described below with respect to the figures. Additional features and advantages are apparent from the subject matter described herein and the claims.

BRIEF DESCRIPTION OF THE DRAWINGS

FIG. 5 is a flow diagram that illustrates an example process of transmitting data to the machine learning platform.

FIG. 6 is a block diagram of an example process for training a conversion machine learning model.

Like reference numbers and designations in the various drawings indicate like elements.

DETAILED DESCRIPTION

Figure 1:
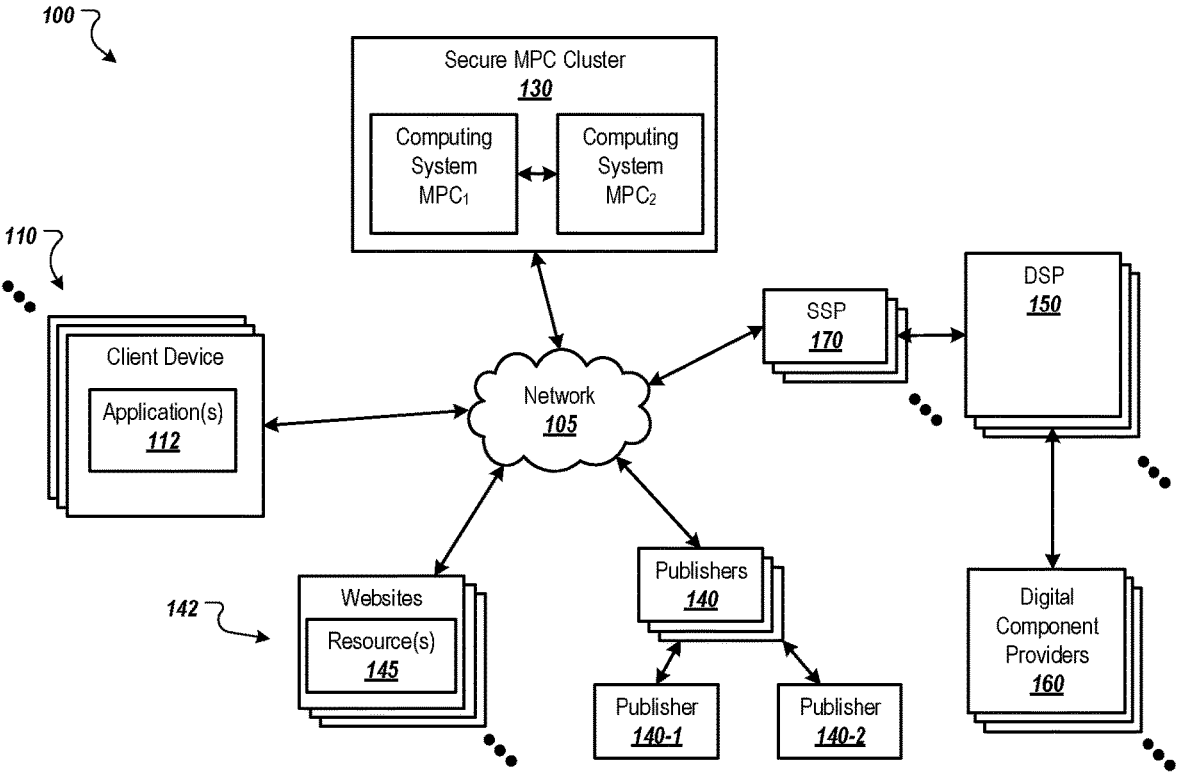
FIG. 1 is a block diagram of an environment in which machine learning models are trained and used to select digital components.

This specification relates to techniques for training machine learning models and using the trained machine learning models to select content to distribute to users based on previous user interactions with the content and in a way that preserves the security of user data. Users connected to the Internet are exposed to a variety of digital content (e.g., search results, web pages, digital components, news articles, social media posts, audio information output by a digital assistant device). Some of these exposures to content may contribute to the users performing a target action. For example, a user that is exposed to a web page about an endangered species may sign up for a newsletter directed to helping save that endangered species, where signing up for the newsletter can be considered the target action. Similarly, a user that is exposed to a digital component in a webpage about a particular type of mobile device can ultimately acquire that particular type of mobile device, where acquisition of the mobile device can be considered the target action. Examples of target actions can also include registering with a website/service, adding items to an online cart, downloading a whitepaper, acquiring a product or even clicking (or otherwise selecting) a digital component. When a user performs a target action, performance of the target action can be referred to as a conversion.

In some cases, content platforms that provide digital components to user devices can record information about user conversions (and other user interactions with the digital component) for the purpose of selecting digital components that are more relevant compared to other digital components, which improves the user experience and reduces wasted resources in transmitting irrelevant information. Historically, such user conversions and/or interaction required collection of certain information and use of third-party cookies. However, as third-party cookies are being deprecated, the solutions described in this document can record information about user conversions and interactions with digital components and enables such information to be used for selecting digital components in ways that preserve user privacy.

In some cases, digital components can be distributed to users by assigning the users to user groups using user profiles that are generated based on events related to the user, e.g., based on the user visiting particular resources or performing particular actions at the resource (e.g., interact with a particular item displayed on a web page or add the item to a virtual cart). These user groups are generally created in a privacy preserving manner, e.g., by creating the user profile at the user's device rather than at a content platform and each user group includes a sufficient number of users, such that no individual user can be identified. This document describes systems and techniques that enable the collection of information regarding user interactions with digital components and conversions without identifying individual users, thereby preserving user privacy and anonymity and without the use of third-party cookies. The techniques further use this data to train machine learning models that can be used to generate a predicted performance measure for selecting digital components.

The techniques and methods are explained with reference to FIGS. 1-4.

FIG. 1 is a block diagram of an environment 100 in which machine learning models are trained and used to select digital components. The example environment 100 includes a data communication network 105, such as a local area network (LAN), a wide area network (WAN), the Internet, a mobile network, or a combination thereof. The network 105 connects client devices 110, the secure MPC cluster 130, publishers 140, websites 142, supply-side platforms (SSPs) 170, and demand-side platforms (DSPs) 150. The SSPs 170 and DSPs 150 are examples of content platforms that manage the selection and distribution of digital components on behalf of publishers 140 and digital component providers 160.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component can be content that is intended to supplement content of a web page or other resource displayed by the application 112. More specifically, the digital component can include digital content that is relevant to the resource content (e.g., the digital component can relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for display to a user of the client device 110.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 can use the same SSP 170.

Digital component providers 160 can create (or otherwise publish) digital components that are presented in digital component slots of publisher's resources and applications. The digital component providers 160 can use a DSP 150 to manage the provisioning of its digital components for display in digital component slots. A DSP 150 is a technology platform implemented in hardware and/or software that automates the process of distributing digital components for display with the resources and/or applications. A DSP 150 can interact with multiple supply-side platforms SSPs on behalf of digital component providers 160 to provide digital components for display with the resources and/or applications of multiple different publishers 140. In general, a DSP 150 can receive requests for digital components (e.g., from an SSP 170), generate (or select) a selection parameter for one or more digital components created by one or more digital component providers based on the request, and provide data related to the digital component (e.g., the digital component itself) and the selection parameter to an SSP 170. The SSP 170 can then select a digital component for display at a client device 110 and provide, to the client device 110, data that causes the client device 110 to display the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item displayed on a web page or add the item to a virtual cart). The user groups can be generated by the digital component providers 160. That is, each digital component provider 160 can assign users to their user groups when the users visit electronic resources of the digital component providers 160.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 displays a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The content platforms can use the user group membership of a user to select digital components or other content that can be of interest to the user or can be beneficial to the user/user device in another way. For example, such digital components or other content can include data that improves a user experience, improves the running of a user device or benefits the user or user device in some other way. However, the user group identifiers of the user group list of a user can be provided in ways that prevent the content platforms, or any other entities, from correlating user group identifiers with particular users, thereby preserving user privacy when using user group membership data to select digital components.

The application 112 can provide user group identifiers from the user group list to a trusted computing system that interacts with the content platforms to select digital components for display at the client device 110 based on the user group membership in ways that prevent the content platforms or any other entities which are not the user itself from knowing a user's complete user group membership.

In some implementations, an application 112 can provide a user interface that enables a user to manage the user groups to which the user is assigned. For example, the user interface can enable the user to remove user group identifiers, prevent all or particular resources 145, publishers 140, content platforms, digital component providers 160, and/or MPC clusters 130 from adding the user to a user group (e.g., prevent the entity from adding user group identifiers to the list of user group identifiers maintained by the application 112). This provides better transparency and control for the user.

Further to the descriptions throughout this document, a user can be provided with controls (e.g., user interface elements with which a user can interact) allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

There can be many reasons as to why storing data for user conversions is beneficial for the user and the content platforms. In one situation, storing data for user conversions can prevent selection and delivery of redundant digital components to the client device. For example, assume that a user wishes to purchase a camera. The content platform adds user to the user group "Camera" and selects digital components that are contextually related to camera and delivers the selected digital components to the client devices for display to the users in the user group. After exposure to a selected digital component, the user performs a target action of purchasing a camera, resulting in a conversion event. In this situation, continuing to select digital components that are contextually related to the user group "Camera" for display on the client device is redundant since the user has already performed the target action.

In another situation, data generated for user conversions can be used to train machine learning models for selecting digital components that, when displayed at the client device, is likely to lead to a conversion thereby avoiding transmission of unnecessary digital components that can reduce network bandwidth usage and improve user experience. For example, assume that a user wishes to purchase a camera. The content platform can add the user to the user group "Camera" based on the user's profile, which can represent the user's online activity which can include visiting a web page with content related to cameras. The content platform can later select, for the user, a digital component that is contextually related to camera and deliver the selected digital component to the client device of the user for display to the user. Even though digital components that are selected based on the user group "Camera" are typically contextually related to camera, the machine learning model can be used to select a smaller subset of digital components from among the multiple digital components that, when displayed to the user on the client device 110, are more likely to result in the user performing a target action, which can correspond to a conversion event. For example, the machine learning model can be used to generate a performance measure, e.g., a predicted performance measure, for digital components. The predicted performance measures can include a predicted user interaction rate, e.g., predicted click-through rate and/or a predicted conversion rate for the digital component. The predicted performance measures can be used to determine or adjust a selection value for the digital component. The selection value is an amount that the digital component provider 160 is willing to provide for the display and/or user interaction with the digital component.

In some implementations, the MPC cluster 130 (also referred to as a machine learning platform) can train a machine learning model (referred to as an interaction machine learning model) that can suggest, or can be used to generate a predicted performance measure that indicates the likelihood that a user will interact (for e.g., by clicking or selecting) with the digital component if the digital component is displayed to the user. In some implementations, the MPC cluster 130 can train a machine learning model (referred to as a conversion machine learning model) that can suggest, or can be used to generate a predicted performance measure that indicates the likelihood of the user performing a target action corresponding to a conversion. The secure MPC cluster 130 includes two computing systems MPC1 and MPC2 that perform secure MPC techniques to train the machine learning models. Although the example MPC cluster 130 includes two computing systems, more computing systems can also be used as long as the MPC cluster 130 includes more than one computing system.

The computing systems MPC1 and MPC2 can be operated by different entities. In this way, each entity cannot have access to the complete or partial user profiles in cleartext.

Cleartext is text that is not computationally tagged, specially formatted, or written in code, or data, including binary files, in a form that can be viewed or used without requiring a key or other decryption device, or other decryption process. For example, one of the computing systems MPC1 or MPC2 can be operated by a trusted party different from the users, the publishers 140, the content platform, and the digital component providers 160. For example, an industry group, governmental group, or browser developer can maintain and operate one of the computing systems MPC1 and MPC2. The other computing system can be operated by a different one of these groups, such that a different trusted party operates each computing system MPC1 and MPC2. Preferably, the different parties operating the different computing systems MPC1 and MPC2 have no incentive to collude to endanger user privacy. In some implementations, the computing systems MPC1 and MPC2 are separated architecturally and are monitored to not communicate with each other outside of performing the secure MPC processes described in this document.

In some implementations, the MPC cluster 130 trains one or more machine learning models for each content platform and/or for each digital component provider 160. For example, each content platform can manage the distribution of digital components for one or more digital component providers 160. A content platform can request that the MPC cluster 130 train a machine learning model for one or more of the digital component providers 160 for which the content platform manages the distribution of digital components. Each machine learning model of a content platform can have a unique model identifier.

After training a machine learning model for a content platform, the content platform can query, or have the application 112 of a client device 110 query the model to generate a predicted performance measure for one or more digital components that are available for display on the client device 110.

Figure 2:
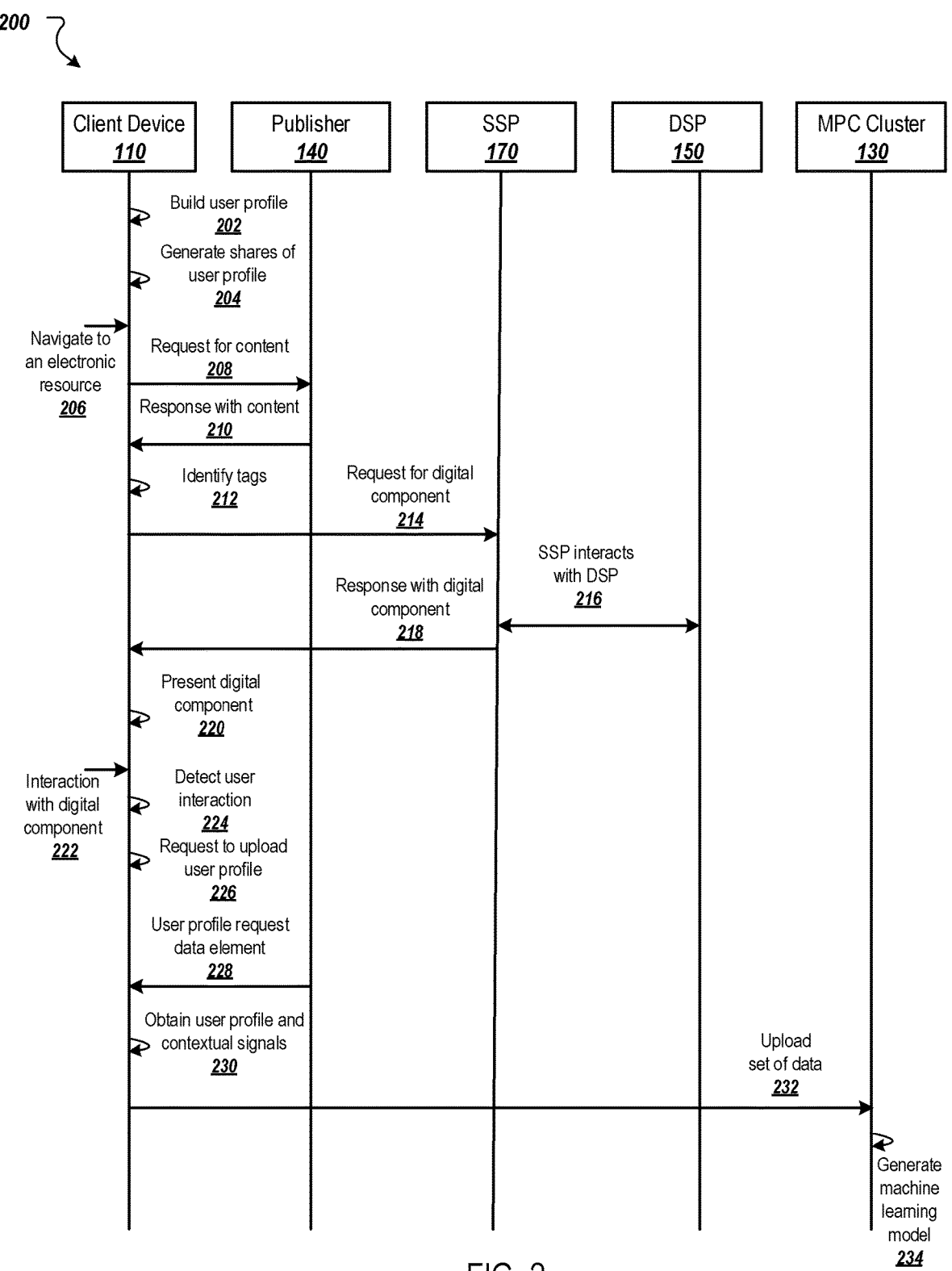
FIG. 2 is a swim lane diagram that illustrates an example process for training an interaction machine learning model.

FIG. 2 is a swim lane diagram that illustrates an example process 200 for training an interaction machine learning model. Operations of the process 200 can be implemented, for example, by the client device 110, the MPC cluster 130, one or more DSPs 150, and an SSP 170. Operations of the process 200 can also be implemented as instructions stored on one or more computer readable media which can be non-transitory, and execution of the instructions by one or more data processing apparatus can cause the one or more data processing apparatus to perform the operations of the process 200.

A content platform can initiate the training and/or updating of one of its machine learning models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in cleartext. In general, each application 112 can store data for a user profile and generate the updated user profile in response to receiving a request from the content platform. As the content of a user profile and the machine learning models differ for different content platforms, the application 112 running on a user's client device 110 can maintain data for multiple user profiles and generate multiple user profiles that are each specific to particular content platforms.

In this example, the user of the client device 110 uses an application 112 such as a web browser or native application to access an electronic resource (e.g., web page or application page) that includes a single digital component slot. However it should be noted that the techniques and methods can be extended to support more than one digital component slot. The application 112 after loading the web page that includes a digital component slot, sends a request for a digital component to the digital component provider based on one or more user groups to which the user of the client device 110 is assigned. In some implementations, the request for a digital component is sent to an SSP 170.

In this example, the SSP 170 is the SSP used by a first content provider (e.g., a publisher) to manage the process of obtaining digital components for digital component slots of its resources and/or applications and the client device 110 requests content in response to an application of the client device 110 loading an electronic resource (e.g., web page or native application) of the publisher.

After receiving the request for a digital component, the SSP 170 can interact with one or more digital component providers 160 and/or one or more DSPs 150. The DSP 150 can select one or more digital components based on contextual data that can include, for example, a resource locator for the resource, e.g., a Universal Resource Locator (URL) for a web page or Universal Resource Identifier (URI) for application content, a language (e.g., the language in which content is displayed by the application rendering the content) and/or coarse geographic location information indicating a coarse location of the client device 110. Other contextual signals can also be used.

In some implementations, prior to sending the digital component to the application 112 executing on the client device 110, the SSP 170 and/or the DSP 150 can include in the digital component, a script that, when executed on the client device 110, detects an occurrence of an interaction event related to interaction or non-interaction with the digital component by the user of the client device when displayed on the client device 110. The application 112 executing on the client device 110 after receiving the digital component displays the digital component on the client device (e.g., rendered in the digital component slots). Although a script is used in this example, the digital component can include other types of computer-readable instructions, such as a library of native code to support software development kit (SDK), a tag, tag value, parameters, JSON object, etc., embedded in the content page or digital component. The application 112 can parse the request and act accordingly.

When a user interacts with (e.g., by pressing his/her finger and/or a stylus on a touch sensitive screen of the client device or otherwise selecting) a digital component triggering an interaction event, the digital component's script, which is executing on the client device 110, detects interaction signals generated by the user interaction with the digital component. In some implementations, an interaction event can also include a non-interaction with a digital component. For example, the script does not detect interaction signals within a specified time frame since the digital component is displayed, based on the user not interacting with the digital component. In such a situation, the script triggers a non-interaction event of the user with the digital component. In some implementations, the interaction and non-interaction events generated by the script can be characterized using a label and/or a feature based on whether the event was generated due to an interaction or a non-interaction. For example, interaction events generated due to an interaction with a digital component can have the value for that feature as "1" if the digital component was interacted with by the user or "0" if the event is a non-interaction event generated because the user did not interact with the digital component. Other values or data can also be used to indicate whether a user interaction with a digital component was detected.

In some implementations, in response to an interaction or a non-interaction event, the script can initiate a request to upload a user profile of the user of the client device 110 to the MPC cluster 130 and one or more additional features related to the digital component and the user interaction for training an interaction machine learning model by the MPC cluster 130.

An application 112 running on a client device 110 builds a user profile for a user of the client device 110 (202). The user profile for a user can include data related to events initiated by the user and/or events that could have been initiated by the user with respect to electronic resources, e.g., web pages or application content. The events can include views of electronic resources, views of digital components, user interactions, or the lack of user interactions, with (e.g., selections of) electronic resources or digital components, conversions that occur after user interaction with electronic resources, and/or other appropriate actions related to the user and electronic resources.

In some implementations, the user profile for a user can be in the form of a feature vector. For example, the user profile can be an n-dimensional feature vector. Each of the n dimensions can correspond to a particular feature and the value of each dimension can be the value of the feature for the user. For example, one dimension can be for whether a particular digital component was displayed to the user. Another feature can be whether there was an interaction or a non-interaction of the user with the digital component. In this example, the value for that feature could be "1" if the digital component was interacted with by the user or "0" if the digital component was not interacted with by the user.

In some implementations, the application 112, per the request of the content platform, can generate a different user profile for different machine learning model owned by the content platform. Based on the design goal, different machine learning models can require different training data. For example, the content platform can create a machine learning model to determine whether to add a user to a user group. In another example, the content platform can create a machine learning model to generate user groups based on the online activity of the users. In this example, the content platform trains a machine learning model to predict whether a user will interact with a particular digital component if the digital component is displayed to the user in a particular context.

The application 112 generates shares of the user profile $P_i$ for the user (204). In this example, the application 112 generates two shares of the user profile $P_i$, one for each computing system of the MPC cluster 130. Note that each share by itself can be a random variable that by itself does not reveal anything about the user profile. Both shares would need to be combined to get the user profile. If the MPC cluster 130 includes more computing systems that participate in the training of a machine learning model, the application 112 would generate more shares, one for each computing system. In some implementations, to protect user privacy, the application 112 can use a pseudorandom function to split the user profile $P_i$ into shares. That is, the application 112 can use pseudorandom function $PRF(P_i)$ to generate two shares $\{[P_i, 1], [P_i, 2]\}$. The exact splitting can depend on the secret sharing algorithm and crypto library used by the application 112.

The user of the client device 110 using the application 112 navigates to an electronic resource (206). For example, the user of the client device 110 can use a browser to visit a website 142 by specifying a reference (e.g., URL). In another example, the user of the client device 110 can use a web browser to submit a search query to the search system that identifies websites by crawling and indexing the websites (e.g., indexed based on the crawled content of the websites). In response, the search system identifies the websites in the form of search results and returns the search results to the client device 110 in the search results page. After viewing the search results, the user of the client device 110 can select and/or click the search result corresponding to the website 142. In yet another example, the user can launch a native application that requests content from a publisher 140 of the application.

The client device 110 generates a request for content and transmits the request over the network 105 to the web server (208). For example, after the user of client device 110 clicks and/or selects the search result corresponding to the website 142 or directly specifies the website 142 by using a reference (e.g., URL), the application 112, e.g., a web browser running on the client device 110 generates a request for digital content (e.g., the website 142) and transmits it over the network 105 to the web server.

The request for digital content can be transmitted, for example, over a packetized network 105, and the content requests themselves can be formatted as packetized data having a header and payload data. The header can specify a destination of the packet and the payload data can include any of the information discussed above.

The publisher 140, e.g., a web server or content server of the publisher 140, responds with the content (210). For example, after receiving the request for content (e.g., the request for the website 142) from the client device 110, a server can respond by transmitting computer-executable instructions and data that can initiate display of a web page at the client device 110. The response can include data related to the web page that is transmitted, for example, over a packetized network 105, and the content themselves can be formatted as packetized data.

The client device 110 identifies tags for digital components in the electronic resource (212). After receiving the electronic resource or content for the electronic resource from the publisher 140, the application 112 can identify the one or more tags, e.g., one or more tags for digital component slots of the electronic resource. For example, a web browser identifies the digital component slot in a website 142.

The client device 110 transmits a request for digital components to the SSP 170 (214). The client device 110 can send the request to a computing system of the SSP 170. For example, the application 112 can generate one or more requests for digital components based on the one or more digital component slots. In a particular example, a web browser can generate a request for digital components based on the tags and transmit the request to the SSP 170 over the network 105.

In some implementations, the request for digital components can also include additional data, such as contextual data. The contextual data can include, for example, a resource locator for the resource, e.g., a Universal Resource Locator (URL) for a web page or Universal Resource Identifier (URL) for application content, a language (e.g., the language in which content is displayed by the application rendering the content) and/or coarse geographic location information indicating a coarse location of the client device 110. Other contextual data can also be used.

The request for digital components can be transmitted, for example, over a packetized network 105, and the component requests themselves can be formatted as packetized data having a header and payload data. The header can specify a destination of the packet and the payload data can include any of the information discussed above.

The SSP 170 interacts with one or more DSPs 150 to select digital components (216). As mentioned before, the digital component providers 160 can use one or more DSPs 150 to automate the process of distributing digital components for display with the applications. After receiving the request, the SSP 170 can interact with one or more DSPs and transmit a corresponding request for digital components that includes optionally the contextual data.

The DSP 150 can respond to the request for digital components of the SSP 170 by transmitting the one or more selected digital components or data identifying the digital components (e.g., creative elements that include instructions for displaying the digital components). For each digital component, the DSP 150 can also generate or select a selection parameter for the digital component. The DSP 150 can then transmit, to the SSP 170, the selection parameter and data for the digital component. Each digital component (or its data) can include additional data, e.g., metadata that indicates the user group identifier corresponding to the digital component. In some implementations, the DSP 150 can also select one or more digital components based on the contextual data and therefore independent of the user's group membership. These digital components can also be referred to as contextual digital components.

After receiving the data for the one or more selected digital components from the DSP 150, the SSP 170 can review and select a set of digital components. For example, the SSP 170 can review the content and format of a digital component to ensure that it meets various criteria, e.g., does not include particular types of content, meets data and/or display size requirements, etc. In some implementations, the SSP 170 selects the digital components based at least in part on the selection parameters received from the DSPs 150. In such implementations, the SSP 170 can select the digital components having the highest selection parameters among the selection parameters received from the DSP 150.

If the SSP 170 approves a digital component, the SSP 170 can generate a signed creative element for the digital component. The signed creative element can include a set of content and a digital signature generated based on the set of content. For example, the set of content can include a creative snippet, a digital component provider identifier that uniquely identifies the digital component provider that created and/or publishes the digital component (which allows the SSP 170 to determine the corresponding DSP 150 for the digital component), creative metadata, a resource locator for the SSP 170, and/or an expiration date for the digital signature (e.g., to require DSPs to resubmit digital components periodically for reverification).

The creative snippet can include the digital component itself (or a resource locator or link to a server from which the digital component can be downloaded). The creative snippet can also include computer-executable code for rendering the digital component, e.g., a script to download the digital component from a server and render the digital component in a digital component slot. The creative snippet can also include computer-executable code for transmitting information about display of the digital component to an aggregation server, e.g., a script that causes a client device to transmit the information to an aggregation server.

The resource locator for the SSP 170 can be the eTLD+1 for a domain of the SSP 170. The eTLD+1 is the effective top-level domain (eTLD) plus one label more than the public suffix. An example eTLD+1 is "example.com" where ".com" is the top-level domain.

The metadata can include a set of properties that enable the SSP 170 to enforce publisher-defined exclusions on digital components. For example, a publisher may not allow digital components having particular properties (e.g., having content related to particular categories) to be displayed with its resources. The metadata can include a list of prohibited categories, topics, or other properties of digital components that are prohibited by the publisher. In some implementations, the SSP 170 can encrypt each property and include each encrypted property in the signed creative element. For example, the SSP 170 can encrypt each property using an asymmetric public key of the SSP 170. In this way, only the SSP 170 can access the cleartext value of each property using the asymmetric private key corresponding to the public key. In some implementations, the SSP 170 can encrypt each property using a symmetric key that the SSP 170 stores confidentially.

The SSP 170 can create the digital signature by signing over the set of content using an asymmetric private key of the SSP 170. Recipients of the signed creative element can verify the digital signature using an asymmetric public key corresponding to the private key used to generate the signature. If any piece of data changes in the set of content after the digital signature is generated, the verification of the digital signature will fail. The SSP 170 can send the signed creative element for each digital component to the DSP 150 for the digital component provider 160 that created/published the digital component.

In some implementations, prior to sending the digital component to the application 112 executing on the client device 110, the SSP 170 and/or the DSP 150 and/or the digital component provider can include in the digital component, a script (for e.g., a code such as JavaScript) that detects an occurrence of an event related to interaction or non-interaction with the digital component by the user of the client device when displayed on the client device 110. The application 112 executing on the client device 110 after receiving the digital component displays the digital component on the client device (for e.g., rendered in the digital component slots).

The SSP 170 transmits digital components to the client device 110 (218). For example, the SSP 170 after selecting the digital components (for e.g., top-K digital components where K can be any number depending upon the particular implementation), transmits the set of digital components (or the data for the digital components) to the application 112 executing on the client device 110 over the network 105. In some implementations, the SSP 170 can transmit along with the set of digital components, a set of selection parameters.

In some implementations, the list of digital components transmitted by the SSP 170 can be ordered based on the selection parameters. This enables the application 112 to select a digital component without knowing the actual selection parameters. The list of digital components can also include, for each digital component, data indicating the user group identifiers corresponding to the digital component. This enables the application 112 to filter out digital components for user groups of which the user is not a member.

In some implementations, as described in more detail below, digital components can be sent to the client device 110 using two separate requests. For example, the MPC cluster or another system can select and provide digital components (or data that can be used to obtain digital components) selected based on the user group membership of the user. In addition, the SSP can select and provide digital components (or data that can be used to obtain the digital components) selected based on the contextual data. In this example, the application 112 can select, for each digital component slot, a final digital component to display in the digital component slot.

The application 112 displays the given digital component (220). The application 112 can display the digital component with the electronic resource of the publisher 140. For example, the application 112 can display the digital component in a digital component slot of the resource.

The user of the client device interacts with a digital component (222). For example, the user of the client device 110 after being exposed to a digital component displayed by the application 112, can interact with (e.g., by pressing his/her finger and/or a stylus on the touch sensitive screen of the client device) the digital component.

The script detects the occurrence of an interaction or a non-interaction event (224). To detect an interaction, the script within the digital component detects a set of interaction signals generated by the interaction with the digital component. For example, the application 112 can execute the script to monitor for user interaction with the digital component. Examples of such interaction signals detected by the script can include the coordinates of the location where the interaction was detected (e.g., the point of contact on a touch-sensitive screen) and the amount of time for which the contact was performed. For example, if the user of the client device uses a stylus to interact with the digital component, the script can detect interaction signals that can include the coordinates of the position where the stylus made contact and the amount of time for which the contact was performed and the pressure applied by the stylus on the touch sensitive screen.

In response to detecting an occurrence of an event, the script generates a request to upload the user profile of the user to the machine learning platform (226). In some implementations, and in response to detecting user interaction with a digital component, the script within the digital component generates a request to upload the user profile by passing a user profile request data element to the application 112. The request to upload user profile can be of the following form UploadUserProfile(Model Identifier, Creative Level Signals, Clicked, Content Platform Domain, Digital Signature). In this form, the parameter "Model Identifier" denotes the identifier for the machine learning model that will be trained using the user profile, the parameter "Creative Level Signals" denotes the creative level signals for the digital component, the parameter "Clicked" denotes whether the digital component was clicked (or otherwise interacted with), the parameter "Content Platform Domain" denotes the domain of the content platform that owns the machine learning model, and "Digital Signature" is a digital signature of the rest of the parameters generated using a private key, e.g., a private key of the application 112 or client device 110. The parameter "Clicked" can be a label with two values indicating whether the digital component was clicked or not clicked. For example, a value of one can indicate that the digital component was clicked and a value of zero can indicate that the digital component was not clicked. Other values can also be used. These parameters are further described with reference to Table 1 below.

The application obtains a user profile request data element from the content platform (228). As mentioned previously, the MPC cluster 130 can create multiple machine learning models for a content platform. These machine learning models can differ from each other based on the underlying machine learning techniques, training methodologies or design goal. For example, a content platform (e.g., DSP 150 or SSP 170) can have the MPC cluster 130 create a machine learning model to determine whether to add a user to a user group. In another example, the content platform can have the MPC cluster 130 create a machine learning model to generate user groups based on the online activity of the users. In this example, the MPC cluster 130 trains an interaction machine learning model to predict whether a user will interact with a particular digital component if the digital component is presented to the user in a particular context. In this example, the content platform trains a machine learning model to generate a performance measure for each digital component that indicates the likelihood that the user will interact with a digital component if the digital component is presented to the user in a particular context. In some implementations, the content platform can include the model identifier of the machine learning model and the one or more characteristics of the digital component in the digital component, e.g., as metadata, before transmitting the digital components to the client device for presentation.

In response to the request to upload the user profile of the user, the application 112 obtains user request profile data element $M_{upload}$ that includes the model identifier for the machine learning model and one or more characteristics of the digital component such as the creative level signals used by the SSP and/or the DSP to select digital components for the application 112, the domain of the content platform and a digital signature of the contents of the token. The content platform can send the model identifier and the one or more characteristics of the digital component in the form of a user profile request data element $M_{upload}$ to the client device. The user profile request data element $M_{upload}$ can have the following items shown as described in Table 1 below:

TABLE 1

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's machine learning model. This item can have multiple values if the same feature vector should be applicable for the training of multiple machine learning models for the same owner domain. |
| 3 | Creative Level Signals | Creative level signals that were used to select digital component by the SSP and/or the DSP. |
| 4 | Token Creation Timestamp | Timestamp indicating when this token is created |
| 5 | Digital Signature | The content platform's digital signature over items 1-7 |

The model identifier identifies the machine learning model for a content platform identified by eTLD+1 domain of the content platform, for which the user profile will be used to train or used to generate predicted performance measures for the digital components before displaying on the client device. The digital signature is generated based on the seven items using a private key of the content platform.

In some implementations, to protect the user profile request data element $M_{upload}$ during transmission, the content platform encrypts the data element $M_{upload}$ prior to sending the data element $M_{upload}$ to the application 112. For example, the content platform can encrypt the user profile request data element $M_{upload}$ using a public key of the application, e.g., PubKeyEnc ($M_{upload}$, application_public_key), where "application_public_key" is the public key of the application 112. The application 112 can verify the data element $M_{upload}$ before obtaining and storing the model identifier and one or more characteristics of the digital component. The application 112 can verify the data element $M_{upload}$ by (i) verifying the digital signature using a public key of the content platform that corresponds to the private key of the content platform that was used to generate the digital signature and (ii) ensuring that the token creation timestamp is not stale, e.g., the time indicated by the timestamp is within a threshold amount of time of a current time at which verification is taking place. If the data element $M_{upload}$ is valid, the application 112 can use the data element. If any verification fails, the application 112 can ignore the upload request.

In yet another example, the content platform can send the model identifier to the application 112 via the script originated from the content platform (or the SSP 170) running inside the application 115 can directly transmit the model via a script API, where the application 115 relies on World Wide Web Consortium (W3C) origin-based security model to protect the event data and update request from falsification or leaking.

The application obtains a user profile and the contextual signals provided to one or more content platforms for use in selecting the digital component (230). The application 112 based on the content platform (identified by the content platform domain) and the model identifier can select the corresponding user profile for the machine learning model specified by the model identifier for the content platform. In this example, the application 112 selects the user profile of the user for a machine learning model implemented by the MPC cluster 130 for scoring digital components.

As discussed before, the application 112 also obtains the contextual data (also referred to as contextual signals) that was previously included in the request for digital components. The contextual data can include, for example, a resource locator for the resource, e.g., a Universal Resource Locator (URL) for a web page or Universal Resource Identifier (URI) for application content, a language (e.g., the language in which content is displayed by the application rendering the content) and/or coarse geographic location information indicating a coarse location of the client device 110. Other contextual data can also be used.

The application uploads a set of data to the machine learning platform (232). After obtaining the user profile request data element, the user profile and the contextual signals, the application 112 executing on the client device 110 uploads the secret shares of the user profile, the one or more characteristics of the digital component, the contextual signals, the model identifier, and data (for example, feature and/or label, e.g., 0 or 1) indicating whether the event is an interaction event or a non-interaction event. For the purpose of explanation the data is also referred to as a label for an event.

In some implementations, the application 112 can also split the one or more characteristics of the digital component, the contextual signals and/or the label (e.g., whether the user interacted with the digital component) into shares. For example the application 112 can generate corresponding shares of contextual signals ([contextual_signals$_{i,1}$] and [contextual_signals$_{i,2}$]), the one or more characteristics of the digital component ([digital_comp_char$_{i,1}$] and [digital_comp_char$_{i,2}$]).

In some implementations, the application 112 generates a composite message C1 of the first share [P$_{i,1}$] of the user profile P$_i$, the first share of the one or more characteristics of the digital component [digital_comp_char$_{i,1}$], the first share of the contextual signals [contextual_signals$_{i,1}$], data indicating whether the event is an interaction event or a non-interaction. event and the model identifier. The application 112 encrypts the composite message using an encryption key of the computing system MPC1,which can be the public key of the computing system MPC1. Similarly, application 112 generates a composite message C2 of the second share [P$^{i,2}$] of the user profile P$_i$, the second share of the one or more characteristics of the digital component [digital_comp_char$_{i,2}$], the second share of the contextual signals [contextual_signals$_{i,2}$], data indicating whether the event is an interaction event or a non-interaction event and the model identifier. The application 112 encrypts the composite message using an encryption key of the computing system MPC2, which can be the public key of the computing system MPC2. These functions can be represented as PubKeyEncrypt(C1, MPC1) and PubKeyEncrypt(C2, MPC2), where PubKeyEncrypt represents a public key encryption algorithm using the corresponding public key of MPC1 or MPC2. The composite message is generated using a reversible method to compose complex messages from multiple simple messages, e.g., JavaScript Object Notation (JSON), Concise Binary Object Representation (CBOR), or protocol buffer.

In some implementations, the order in which the application 112 uploads the first encrypted shares to the computing system MPC1 must match the order in which the application 112 uploads the second encrypted shares to the computing system MPC2. This enables the computing systems MPC1 and MPC2 to properly match two shares of the same secret, e.g., two shares of the same user profile.

In some implementations, the application 112 can explicitly assign the same pseudo randomly or sequentially generated identifier to shares of the same secret to facilitate the matching. While some MPC techniques can rely on random shuffling of input or intermediate results, the MPC techniques described in this document may not include such random shuffling and can instead rely on the upload order to match.

The machine learning platform generates an interaction machine learning model (234). The computing systems MPC1 and MPC2 can train a machine learning model based on a sample S$_i$ from their respective training dataset such that each sample from the respective training dataset includes their encrypted shares of the user profiles, the one or more characteristics of the digital component, the contextual signals, and the label indicating whether the event is an interaction event or a non-interaction event.

Each time a new machine learning model is generated based on user profile data can be referred to as a training session. The computing systems MPC1 and MPC2 can train a machine learning model based on the encrypted shares of the user profiles received from the client devices 110. For example, the computing systems MPC1 and MPC2 can use MPC techniques to train a k-NN model based on the shares of the user profiles.

To minimize or at least reduce the crypto computation, and thus the computational burden placed on the computing systems MPC1 and MPC2 to protect user privacy and data during both model training and inference, the MPC cluster 130 can use random projection techniques, e.g., SimHash, to quantify the similarity between two samples S$_i$ and S$_j$ quickly, securely, and probabilistically. The similarity between the two samples $S_i$ and $S_j$ can be determined by determining the Hamming distance between two bit vectors that represent the two samples $S_i$ and $S_j$, which is inversely proportional to the cosine distance between the two samples with high probability.

Conceptually, for each training session, m random projection hyperplanes $U=\{U_1, U_2, \ldots U_m\}$ can be generated. The random projection hyperplanes can also be referred to as random projection planes. One objective of the multi-step computation between the computing systems MPC1 and MPC2 is to create a bit vector $B_i$ of length m for each sample $S_i$ used in the training of the k-NN model. In this bit vector $B_i$, each bit represents the sign of a dot product of one of the projection planes $U_j$ and the sample $S_i$, i.e., $B_{i,j}=\text{sign}(U_j \odot S_i)$ for all $j \in [1, m]$ where $\odot$ denotes the dot product of two vectors of equal length. That is, each bit represents which side of the plane $U_j$ the sample $S_i$ is located. A bit value of one represents a positive sign and a bit value of zero represents a negative sign.

At the end of the multi-step computation, each of the two computing systems MPC1 and MPC2 generates an intermediate result that includes a bit vector for each sample in cleartext, a share of each sample, and a share of the label for each user profile. For example, the intermediate result for computing system MPC1 can be the data shown in Table 2 below. The computing system MPC2 would have a similar intermediate result but with a different share of each user profile and each label. To add extra privacy protection, each of the two servers in the MPC cluster 130 can only get half of the m-dimensional bit vectors in cleartext, e.g., computing system MPC1 gets the first m/2 dimension of all the m-dimension bit vectors, computing system MPC2 gets the second m/2 dimension of all the m-dimension bit vectors.

TABLE 2

| Bit Vector in Cleartext | MPC1 share for $P_i$ | MPC1 share for label$_i$ |
| --- | --- | --- |
| . . . | . . . | . . . |
| $B_i$ | . . . | . . . |
| $B_{i+1}$ | . . . | . . . |
| . . . | . . . | . . . |

Given two arbitrary samples $P_i$ and $P_j$ of unit length $i \neq j$, it has been shown that the Hamming distance between the bit vectors $B_i$ and $B_j$ for the two samples $P_i$ and $P_j$ is proportional to the cosine distance between the sample vectors $P_i$ and $P_j$ with high probability, assuming that the number of random projections m is sufficiently large.

Based on the intermediate result shown above and because the bit vectors $B_i$ are in cleartext, each computing system MPC1 and MPC2 can independently create, e.g., by training, a respective k-NN model using a k-NN algorithm. The computing systems MPC1 and MPC2 can use the same or different k-NN algorithms. Once the k-NN models are trained, the application 112 can query the k-NN models to determine a predicted performance of digital components.

The computing systems MPC1 and MPC2 can then use one of several possible machine learning techniques (e.g., binary classification, multiclass classification, regression, etc.) to determine, based on the k-NN model, whether to select a digital component for display to the user on the client device. One of the methods that has been discussed previously includes generating a performance measure, e.g., a predicted performance measure, for the digital components. In this example, the predicted performance measure indicates the likelihood of the user interacting with the digital component when the digital component is displayed to the user. Based on the predicted performance measure, the digital components can be selected by the application 112 on the client device 110. Another method of selecting digital components can include classifying the digital components into categories. For example, the k-NN model can classify digital components into two classes A and B such that digital components classified as class A have a higher probability of being interacted with by the user when displayed on the client device 110 and digital components classified as class B have a lower probability of being interacted with by the user. The application 112 can then select digital components from class A for display to the user. After training the interaction machine learning model, the model can be used to select digital components for display to the user. This is further explained with reference to FIG. 4.

Figure 3:
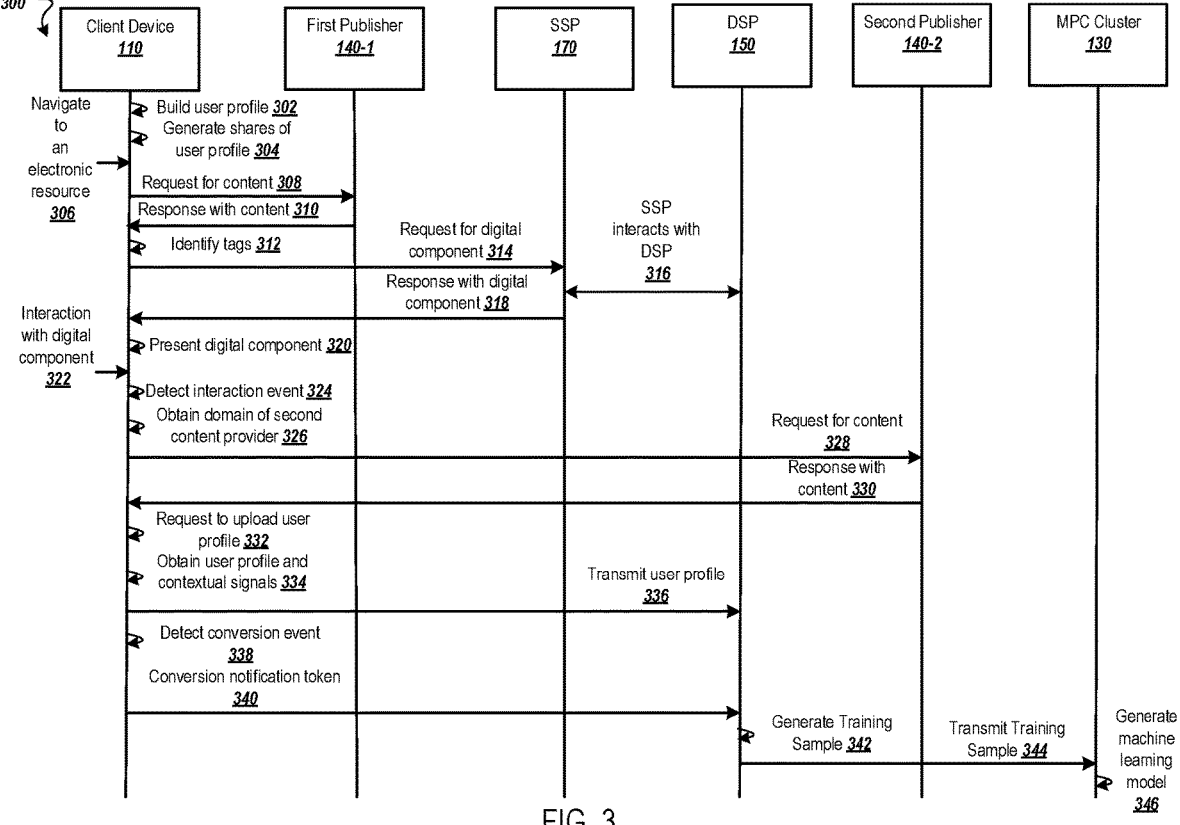
FIG. 3 is a swim lane diagram that illustrates an example process for training a conversion machine learning model.

FIG. 3 is a flow diagram of an example process 300 for training a conversion machine learning model. Operations of the process 300 can be implemented, for example, by the client device 110, the MPC cluster 130, one or more DSPs 150, and an SSP 170. Operations of the process 300 can also be implemented as instructions stored on one or more computer readable media which can be non-transitory, and execution of the instructions by one or more data processing apparatus can cause the one or more data processing apparatus to perform the operations of the process 300.

Similar to the process 200, a content platform can initiate the training and/or updating the conversion machine learning model by requesting that applications 112 running on client devices 110 to generate a user profile for its respective user and upload secret-shared and/or encrypted versions of the user profiles to the MPC cluster 130.

In this example, the user of the client device 110 uses an application 112 such as a web browser or native application to access an electronic resource (e.g., web page or application page) that includes a digital component slot. However it should be noted that the techniques and methods can be extended to support more than one digital component slot. The application 112 after loading the web page 142 that includes a digital component slot, sends a request for a digital component to the SSP 170 based on one or more user groups to which the user of the client device 110 is assigned. Assume that the application 112 selects a digital component and displays the digital component with the web page 142. If the user interacts (e.g., pressing his/her finger and/or a stylus on the touch sensitive screen of the client device) with a digital component triggering an interaction event, the user is redirected to a different resource such as a web page 144 (also referred to as a second content page). For example, if the digital component on the web page 142 is related to shoes of a particular brand X, the user interaction with the digital component can redirect the user to a webpage 144 of the brand X. In some implementations, the second content page can be provided by a second publisher that is different from the publisher that provided the first content page. For example, the second content page can be a landing page for the digital component, e.g., a landing page linked to by the digital component.

It should be noted that the script within the digital component executing on the client device 110 detects interaction signals generated by the user interaction with the digital component and triggers an interaction event (as described with reference to FIG. 3). In response to the interaction event, the script generates a request in response to detection of an occurrence resulting in uploading a set of data that includes the user profile, the one or more characteristics of the digital component, the contextual signals, and data indicating whether the event is an interaction event or a non-interaction event.

In some implementations, the script in response to detecting a user interaction with the digital component obtains the eTLD+1 domain of the second publisher that provides the second content page. For example, if the digital component displayed within the website 142 is related to shoes of a particular brand X and the user interaction with the digital component will redirect the user to a webpage 144 of the brand X, the script obtains the eTLD+1 domain of the webpage 144 of brand X. After obtaining the eTLD+1 domain of the second content page, the scripts interacts with the application 112 (for e.g., via an API) and instructs the application to obtain the current user profile of the user of the client device 110, the contextual signals, the one or more characteristics of the digital component. In some implementations, libraries of native code embedded in the application 112, e.g., an SDK or other computer-readable code or instructions, detects the user interaction with the digital component and triggers an interaction event and performs all actions described above performed by the script.

In some implementations, the second content page includes a tag (for e.g., a script that is different from the script within the digital component) which after being uploaded to the client device 110 generates a request for the contextual signals, the one or more characteristics of the digital component and the user profile. For example, when the user of the client device 110 is redirected to the web page 144, the webpage 144 that includes the tag gets uploaded to the client device and generates the request for the current user profile of the user, the contextual signals and the one or more characteristics of the digital component that the user of the client device 110 interacted with. In response to the request, the application 112 generates secret shares of the user profile, the contextual signals and the one or more characteristics of the digital component and transmits the secret shares to the corresponding DSP 150.

In some implementations, when the tag on the second content page detects a user conversion, the tag on the second content page transmits a conversion notification token to the DSP 150 that includes one or more characteristics describing the user conversion. For example, if the user after being redirected to the webpage 144 of brand X, performs a target action of purchasing a pair of shoes, the tag on webpage 144 transmits a conversion notification token to the DSP 150 that can include the amount of time user visited the webpage 144, user actions on the webpage 144, description of the target action performed by the user on webpage 144, the monetary amount of the purchase etc.

After receiving the shares of the user profile, the contextual signals, the one or more characteristics of the digital component and the conversion notification, the DSP 150 associates the conversion notification with the corresponding shares of the user profile, the contextual signals, the one or more characteristics of the digital component to create training samples and transmits them to the MPC cluster 130. The MPC cluster 130 after receiving the training samples from the DSP 150, can generate a conversion machine learning model. During inferencing, the MPC cluster 130 can be queried based on the conversion machine learning model, a predicted conversion value for digital components based on which digital components can be selected for display to the user.

An application 112 running on a client device 110 builds a user profile for a user of the client device 110 (302). Similar to step 202 of the process 200, the application 112, per the request of the content platform, can generate a different user profile for different machine learning model owned by the content platform.

The application 112 generates shares of the user profile $P_i$ for the user (304). Similar to step 202 of the process 200, the application 112 generates two shares of the user profile $P_i$, one for each computing system of the MPC cluster 130. If the MPC cluster 130 includes more computing systems that participate in the training of a machine learning model, the application 112 would generate more shares, one for each computing system. The application 112 can use a pseudo-random function to split the user profile $P_i$ into shares. That is, the application 112 can use pseudorandom function $PRF(P_i)$ to generate two shares $\{[P_{i,1}],[P^{i,2}]\}$. The exact splitting can depend on the secret sharing algorithm and crypto library used by the application 112.

The user of the client device 110 using the application 112 navigates to an electronic resource (306). For example, the user of the client device 110 can use a browser to visit a website 142 by specifying a reference (e.g., URL) or use a web browser to submit a search query to the search system that identifies the websites in the form of search results and returns the search results to the client device 110 in the search results page. After viewing the search results, the user of the client device 110 can select and/or click the search result corresponding to the website 142. In yet another example, the user can launch a native application that requests content from a publisher 140 of the application.

The client device 110 generates a request for content and transmits the request over the network 105 to the first publisher (308). For example, after the user of client device 110 clicks and/or selects the search result corresponding to the website 142 or directly specifies the website 142 by using a reference (e.g., URL), the application 112, e.g., the web browser running on the client device 110 generates a request for digital content (e.g., the website 142) and transmits it over the network 105 to the web server.

The first publisher responds with the content (310). For example, after receiving the request for content (e.g., the request for the website 142) from the client device 110, a web server of the publisher 142-1 can respond by transmitting computer-executable instructions and data that initiate display of a web page at the client device 110. The response can include data related to the web page that is transmitted, for example, over a packetized network 105, and the content themselves can be formatted as packetized data.

The client device 110 identifies tags for digital components in the electronic resource (312). After receiving the electronic resource or content for the electronic resource from the publisher 140-1, the application 112 can identify the one or more tags, e.g., one or more tags for digital component slots of the electronic resource. For example, a web browser identifies the digital component slot in a website 142.

The client device 110 transmits a request for digital components to the SSP 170 (314). The client device 110 can send the request to a computing system of the SSP 170. For example, the application 112 can generate one or more requests for digital components based on the one or more digital component slots. In a particular example, a web browser can generate a request for digital components based on the tags and transmit the request to the SSP 170 over the network 105. The request for digital components can also include additional data, such as contextual data.

The SSP 170 interacts with one or more DSPs 150 to select digital components (316). Similar to the step 216 of the process 200, after receiving the request, the SSP 170 can interact with one or more DSPs 150 and transmit a corresponding request for digital components that includes optionally the contextual data. The DSP 150 can respond to the request for digital components of the SSP 170 by transmitting the one or more selected digital components or data identifying the digital components. Prior to sending the digital component to the application 112 executing on the client device 110, the SSP 170 and/or the DSP 150 and/or the digital component provider can include in the digital component, a script (for e.g., a code such as JavaScript) that detects an occurrence of an event related to interaction or non-interaction with the digital component by the user of the client device when displayed on the client device 110.

The SSP 170 transmits digital components to the client device 110 (318). Similar to the step 218 of the process 200, the SSP 170 after selecting the digital components (for e.g., top-K digital components where K can be any number depending upon the particular implementation), transmits the set of digital components (or the data for the digital components) to the application 112 executing on the client device 110 over the network 105. In some implementations, the SSP 170 can transmit along with the set of digital components, a set of selection parameters.

The application 112 displays the given digital component (320). For example, application 112 can display digital component with the electronic resource of the publisher 140.

The user interacts with the digital component (322). For example, after being displayed with the first content page (for e.g., webpage 142) and a digital component by the application 112, the user of the client device 110 can interact with (for e.g., by pressing his/her finger and/or a stylus on the touch sensitive screen of the client device) the digital component. In some cases the user can also choose not to interact with the digital component. For example, if the user of the client device 110 finds the digital component uninteresting, the user can choose not to interact with the digital component.

The script detects the occurrence of an interaction or a non-interaction event (324). To detect an interaction, the script executing within the digital component detects a set of interaction signals generated by the interaction with the digital component. Examples of such interaction signals detected by the script can include the coordinates of the location where the interaction was detected (e.g., the point of contact on a touch-sensitive screen) and the amount of time for which the contact was performed. For example, if the user of the client device uses a stylus to interact with the digital component, the script can detect interaction signals that can include the coordinates of the position where the stylus made contact and the amount of time for which the contact was performed and the pressure applied by the stylus on the touch sensitive screen. If the script does not detect any interaction signals with the digital component, the script registers the event as a non-interaction event.

The script obtains the domain of the second publisher (326). In response to detecting a user interaction with the digital component, the script obtains the eTLD+1 domain of a second publisher that provides the second content page. For example, if the digital component displayed within the website 142 is related to shoes of a particular brand X and the user interaction with the digital component will redirect the user to a webpage 144, e.g., a landing page, of the brand X published by a web server of the publisher 140-2, the script obtains the eTLD+1 domain of the brand X.

The user is redirected to a second content page provided by a second publisher (328). For example, if the digital component on the web page 142 is related to shoes of a particular brand X, the user interaction with the digital component can redirect the user to a webpage 144 of the brand X. The second content page can be provided by a second publisher 140-2 that is different from the publisher 140-1 that provided the first content page. The application 112 executing on the client device 110 generates a request for digital content (e.g., the website 144) and transmits it over the network 105 to a web server of the publisher 140-2.

The second publisher responds with the content (330). For example, after receiving the request for content (e.g., the request for the webpage 144 that includes a tag) from the client device 110, the web server of the publisher 140-2 hosting the webpage 144 can respond by transmitting computer-executable instructions and data that initiate display of a web page at the client device 110. The response can include data related to the web page that is transmitted, for example, over a packetized network 105, and the content themselves can be formatted as packetized data.

The tag on the webpage 144 generates a request to upload user profile (332). The tag on the webpage 144 includes computer executable instructions, that when executed on the client device 110, generates a request to upload user profile along with the contextual signals, the one or more characteristics of the digital component.

The application 112 encrypts the user profile (334). In some implementations, the application 112 can split the one or more characteristics of the digital component, the contextual signals into shares based on the computing systems of the MPC cluster 130. For example, the application 112 can generate corresponding shares of contextual signals ([contextual_signals$_{i,1}$] and [contextual_signals$_{i,2}$]) and shares of one or more characteristics of the digital component ([digital_comp_char$_{i,1}$] and [digital_comp_char$_{i,2}$]) for MPC1 132 and MPC2 134 respectively.

In some implementations, the application 112 generates two or more composite messages for each of the two or more computation systems of the MPC cluster 130 such that a composite message for a computation system includes the respective shares of information that is required to be provided to the computation system. For example, the application 112 generates a composite message C1_conversion of the first share [P$_{i,1}$] of the user profile P$_i$, the first share of the one or more characteristics of the digital component [digital_comp_char$_{i,1}$], the first share of the contextual signals [contextual_signals$_{i,1}$]. The application 112 encrypts the composite message using an encryption key of the computing system MPC1. Similarly, application 112 generates a composite message C2_conversion of the second share [P$_{i,2}$] of the user profile P$_i$, the second share of the one or more characteristics of the digital component [digital_comp_char$_{i,2}$], the second share of the contextual signals [contextual_signals$_{i,2}$]. The application 112 encrypts the composite message using an encryption key of the computing system MPC2.

The application sends the user profile to the DSP 150 (336). In some implementations, the application 112 transmits the individual composite messages to the DSP 150. In other implementations, the applications 112 can transmit the composite messages directly to MPC cluster 130. Note that when the encrypted composite messages are transmitted to the DSP 150, the DSP 150 does not see the messages in cleartext since the messages are encrypted using the encryption key of the computing systems of the MPC cluster 130.

In some implementations the order in which the application 112 uploads the first encrypted shares to the recipient must match the order in which the application 112 uploads the second encrypted shares. This enables the recipient to properly match two shares of the same secret, e.g., two shares of the same user profile.

In some implementations, the application 112 can explicitly assign the same pseudo randomly or sequentially generated identifier and a timestamp indicating the time when the shares are uploaded to the shares of the same secret to facilitate the matching. While some MPC techniques can rely on random shuffling of input or intermediate results, the MPC techniques described in this document can not include such random shuffling and can instead rely on the upload order to match.

The tag on the webpage 144 detects a user conversion (338). For example, the user after being redirected to the webpage 144, performs a target action designated by the webpage 144, the tag on webpage 144 detects a user conversion and obtains one or more characteristics describing the user conversion. For example, the user after being redirected to the webpage 144 of brand X, performs a target action of purchasing a pair of shoes, the tag on webpage 144 detects a conversion. The one or more characteristics describing the user conversion can include the amount of time user visited the webpage 144, user actions on the webpage 144, description of the target action performed by the user on webpage 144, the monetary amount of a purchase if the conversion is a purchase, etc.

The tag on the webpage 144 transmits a conversion notification token to the DSP 150 (340). In some implementations, the tag within the second content page, in response to detecting a user conversion, generates and transmits a conversion notification token to the DSP 150. In some implementation, the conversion notification token can include a feature and/or a label (referred to as a conversion label) that indicates whether the user converted by performing the intended target action or not. The conversion notification token can optionally include the one or more characteristics describing the user conversion.

In some implementations, the tag within the second content page generates a conversion notification token even if the tag does not detect a user conversion and transmits the notification token to the first publisher. In such implementation, the conversion notification token can include a field that represents whether or not the user conversion was detected.

In some implementations, the tag on the webpage 144 can include in the conversion notification token the same pseudo randomly or sequentially generated identifier that was assigned to shares of the same secret to facilitate the matching and a current timestamp indicating the time of user conversion. If the application 112 had previously used a first party cookie of the content platform to recognize the same user in the same first party domain, the tag of the webpage 144 can include the same first party cookie in the conversion notification token.

The DSP 150 generates training samples (342). Since the timestamps of the user selecting a digital component and redirecting to the second content page (e.g., timestamp associated to the encrypted shares of user profiles) can be different from the timestamp of the user conversion because the user can take some time to perform the intended target action, the secret shares of the user profiles, the digital component that was displayed and interacted with by the user, the contextual features, the one or more characteristics of the digital component and the conversion notification token can have different timestamps. In some implementations, the DSP 150 uses the first party cookie to recognize the same user in the same first party domain. The DSP 150 further uses the pseudo randomly or sequentially generated identifier and the associated timestamps of the secret shares and the conversion notification to match the different shares and the conversion label from the user conversion token to generate a training sample. In some implementations, the allowable time difference between these two timestamps (for e.g., the time of a user selecting a digital component and redirecting to the second content page and the time of user conversion) can be decided by the designer of the system. In other implementations, the MPC cluster 130 can deduce the allowable time difference based on the patterns in the online activity of the user or can use a machine learning model to predict the allowable time difference. In some implementations, if the secret shares and the conversion notification token is directly transmitted to the MPC cluster 130, the MPC cluster 130 can match the different shares and the conversion label to generate training samples. Note that the secret shares are encrypted using the encryption key of the computing systems of the MPC cluster 130 because of which the DSP 150 cannot access the shares in plain text.

The DSP 150 transmits the training samples to the MPC cluster 130 (344). In some implementations, the DSP 150 after generating the training samples transmits the training samples in batches to the respective computing system of the MPC cluster 130 for training the conversion machine learning model. In other implementations, the DSP 150 after generating a training example, can simultaneously transmit the training samples to the respective computing system of the MPC cluster 130.

The machine learning platform generates a conversion machine learning model (346). The computing systems MPC1 and MPC2 can train a conversion machine learning model based on the training samples that include the encrypted shares of the user profiles, the one or more characteristics of the digital component, the contextual signals, and a conversion label indicating whether the user of the client device has converted or not.

The computing systems MPC1 and MPC2 can train a machine learning model based on a sample $S_i$ from their respective training dataset such that each sample from the respective training dataset includes their encrypted shares of the user profiles, the one or more characteristics of the digital component, the contextual signals, and the conversion label.

Each time a new machine learning model is generated based on user profile data can be referred to as a training session. The computing systems MPC1 and MPC2 can train a machine learning model based on the encrypted shares of the user profiles received from the client devices 110. For example, the computing systems MPC1 and MPC2 can use MPC techniques to train a k-NN model based on the shares of the user profiles.

The MPC cluster 130 can use random projection techniques, e.g., SimHash, to quantify the similarity between two samples $S_i$ and $S_j$ quickly, securely, and probabilistically. The similarity between the two samples $S_i$ and $S_j$ can be determined by determining the Hamming distance between two bit vectors that represent the two samples $S_i$ and $S_j$, which is inversely proportional to the cosine distance between the two samples with high probability.

Similar to step 232 of the process 200, the computing systems MPC1 and MPC2 create bit vector $B_i$ of length m for each sample $S_i$ used in the training of the k-NN model. In this bit vector $B_i$, each bit $B_{i,j}$ represents the sign of a dot product of one of the projection planes Uj and the sample $S_i$, i.e., $B_{i,j}=\text{sign}(U_j \odot S_i)$ for all $j \in [1, m]$ where $\odot$ denotes the dot product of two vectors of equal length. At the end of the multi-step computation, each of the two computing systems MPC1 and MPC2 generates an intermediate result that includes a bit vector for each sample in cleartext, a share of each sample, and a share of the conversion label for each user profile. The two servers in the MPC cluster 130 can only get half of the m-dimensional bit vectors in cleartext, e.g., computing system MPC1 gets the first m/2 dimension of all the m-dimension bit vectors, computing system MPC2 gets the second m/2 dimension of all the m-dimension bit vectors.

Based on the intermediate result shown above and because the bit vectors $B_i$ are in cleartext, each computing system MPC1 and MPC2 can independently create, e.g., by training, a respective k-NN model using a k-NN algorithm. The computing systems MPC1 and MPC2 can use the same or different k-NN algorithms. Once the k-NN models are trained, the application 112 can query the k-NN models to determine a predicted likelihood of conversion.

The computing systems MPC1 and MPC2 can then use one of several possible machine learning techniques (e.g., binary classification, multiclass classification, regression, etc.) to determine, based on the k-NN model, whether to select a digital component for display to the user on the client device. One of the methods that has been discussed previously includes generating a performance measure, e.g., a predicted performance measure, for the digital components. In this example, the predicted performance measure indicates the likelihood of the user performing a target action thereby undergoing conversion. Based on the predicted performance measure, the digital components can be selected by the application 112 on the client device 110. This is further explained with reference to FIG. 4.

Figure 4:
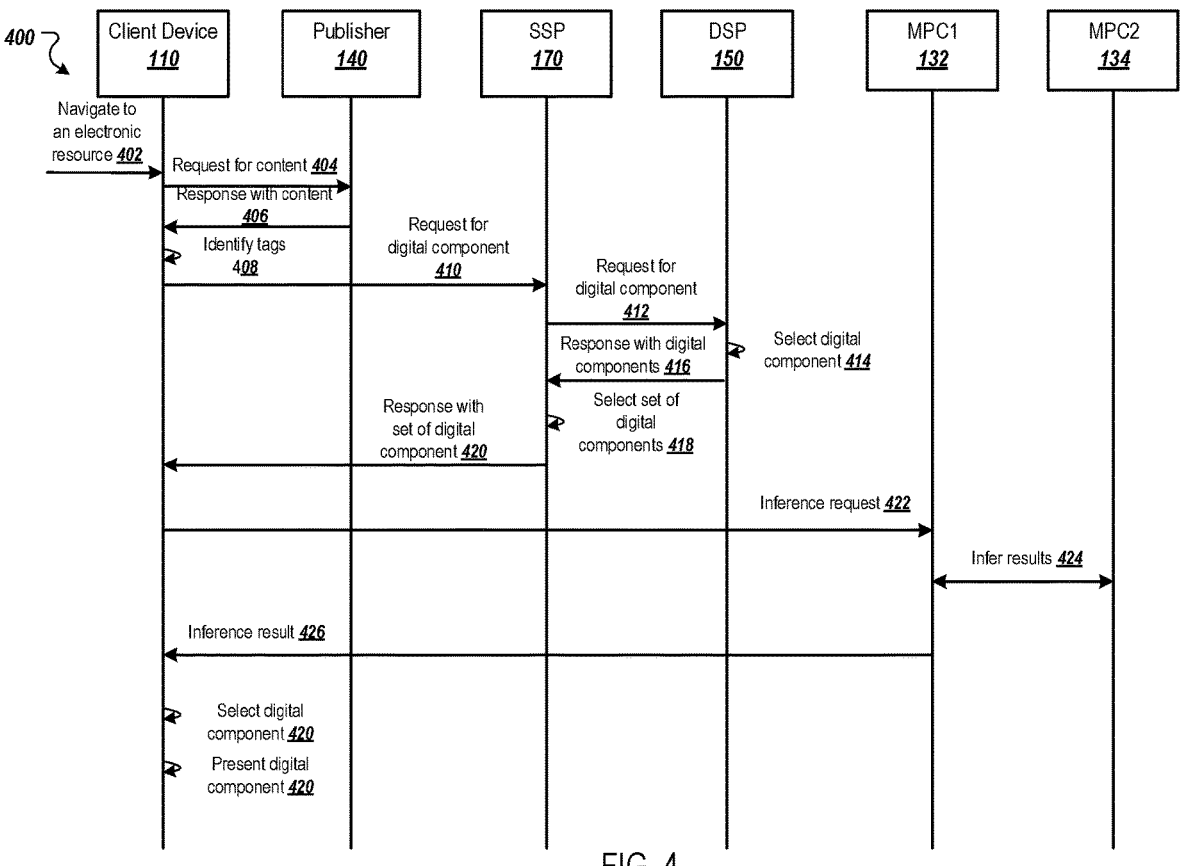
FIG. 4 is a swim lane diagram that illustrates an example process for inferencing and selecting digital components using the interaction and/or the conversion machine learning model.

FIG. 4 is a swim lane diagram that illustrates an example process 400 for requesting and selecting digital components based on the interaction machine learning model and/or the conversion machine learning model. Operations of the process 400 can be implemented, for example, by the client device 110, an SSP 170, one or more DSPs 150, and a publisher 140. Operations of the process 400 can also be implemented as instructions stored on one or more computer readable media which can be non-transitory, and execution of the instructions by one or more data processing apparatus can cause the one or more data processing apparatus to perform the operations of the process 400.

In this example, the user of the client device 110 uses an application 112 such as a web browser or native application to access an electronic resource (e.g., web page or application page) that includes a digital component slot.

The application 112 after loading the web page that includes a digital component slot, sends one or more requests for a digital component. In some implementations, the application 112 sends a user group-based request and a contextual request. The user group-based request can be a request for digital components that are selected based on the user group(s) that include the user as a member. This request can be sent to a content platform (e.g., to an SSP), to an MPC cluster, or to another server depending on the preferred level of user privacy. As this request can include one or more user group identifiers for user group(s) that include the user as a member, the request can be handled differently than a contextual request. The contextual request, which can include contextual data but not user group membership data, can be sent to a content platform, e.g., an SSP.

Upon receiving a request for a digital component, the SSP 170 can interact with one or more digital component providers and/or one or more DSPs 150 to obtain digital components for display with the applications.

The DSP 150 selects one or more digital components from a set of available digital components. For a user group-based request, the DSP 150 can filter out digital components that do not have a corresponding user group identifier that matches one of the user group identifiers included in the request. The DSP can select a digital component from the filtered set, e.g., based on contextual data. For a contextual request, the DSP 150 can select a digital component based on the contextual data included in the request.

The DSP 150 can further select digital components (for e.g., top-N digital components) by analyzing and scoring each of the one or more selected digital components. The DSP 150 then transmits the selected digital component(s), creative elements for the digital component(s), or data identifies or can be used to obtain the digital component(s) to the SSP 170 (or to the MPC cluster or another server). For example, the DSP 150 can provide digital components to the MPC cluster or another server in response to a user group-based request and provide digital components to the SSP 170 for contextual requests.

After receiving digital components from the DSP(s) 150, the SSP 170 can review and select a set of digital components (for e.g., top-K digital components) prior to enabling the digital components to be provided for display on the client device based on criteria and/or conditions set by the publisher 140. For example, the SSP 170 can review the content and format of a digital component to ensure that it meets various criteria, e.g., does not include particular types of content, meets data and/or display size requirements, etc. The set of digital components is sent to the application 112 executing on the client device 110.

The application 112 executing on the client device 110 after receiving the set of digital components can select a subset of digital components by filtering out from the set of digital components, one or more digital components that have the lowest likelihood of being interacted with by the user. To filter out the one or more digital components from the set of digital components, the application 112 identifies the respective predicted performance measures for each digital component in the set of digital components generated by the interaction machine learning model. After selection, the one or more digital component is displayed on the client device (for e.g., rendered in the digital component slots). In some implementations, the selection of digital components is not solely based on the predicted performance measures of the digital components. For example, the application 112 can take into consideration, the predicted performance measure of the digital component along with the contextual properties of the digital components, an agreement or a condition related to the digital components set by the component provider (for e.g., a value indicating a monetary value received by the SSP to display digital components) or user defined rules of inclusion or exclusion of digital components.

The user of the client device 110 using the application 112 navigates to an electronic resource (402). For example, the user of the client device 110 can use a browser to visit a website 142 by specifying a reference (e.g., URL). In another example, the user of the client device 110 can use a web browser to submit a search query to the search system that identifies websites by crawling and indexing the websites (e.g., indexed based on the crawled content of the websites). In response, the search system identifies the websites in the form of search results and returns the search results to the client device 110 in the search results page. After viewing the search results, the user of the client device 110 can select and/or click the search result corresponding to the website 142. In yet another example, the user can launch a native application that requests content from a publisher 140 of the application.

The client device 110 generates a request for content and transmits the request over the network 105 to the web server (404). For example, after the user of client device 110 clicks and/or selects the search result corresponding to the website 142 or directly specifies the website 142 by using a reference (e.g., URL), the application 112, e.g., the web browser running on the client device 110 generates a request for digital content (e.g., the website 142) and transmits it over the network 105 to the web server.

The request for digital content can be transmitted, for example, over a packetized network 105, and the content requests themselves can be formatted as packetized data having a header and payload data. The header can specify a destination of the packet and the payload data can include any of the information discussed above.

The publisher 140, e.g., a web server or content server of the publisher 140, responds with the content (406). For example, after receiving the request for content (e.g., the request for the website 142) from the client device 110, a server can respond by transmitting computer-executable instructions and data that initiate display of a web page at the client device 110. The response can include data related to the web page that is transmitted, for example, over a packetized network 105, and the content themselves can be formatted as packetized data.

The client device 110 identifies tags for digital components in the electronic resource (408). After receiving the electronic resource or content for the electronic resource from the publisher 140, the application 112 can identify the one or more tags, e.g., one or more tags for digital component slots of the electronic resource. For example, a web browser can identify one or more digital component slots in a website 142.

The client device 110 transmits a request for digital components to the SSP 170 (410). For example, the application 112 can generate one or more requests for digital components based on the one or more digital component slots. In a particular example, a web browser can generate a request for digital components based on the tags and transmit the request to the SSP 170 over the network 105.

In some implementations, the request for digital components can include the user group identifiers of the user groups with which the client device is associated. In some implementations, the request for digital components can also include additional data, such as contextual data. The contextual data can include, for example, a resource locator for the resource, e.g., a Universal Resource Locator (URL) for a web page or Universal Resource Identifier (URI) for application content, a language (e.g., the language in which content is displayed by the application rendering the content) and/or coarse geographic location information indicating a coarse location of the client device 110.

The request for digital components can be transmitted, for example, over a packetized network 105, and the component requests themselves can be formatted as packetized data having a header and payload data. The header can specify a destination of the packet and the payload data can include any of the information discussed above.

The SSP 170 transmits a request for digital components to one or more DSPs 150 (412). As mentioned before, the digital component providers 160 can use one or more DSPs 150 to automate the process of distributing digital components for display with the applications. After receiving the request, the SSP 170 can interact with one or more DSPs and transmit a corresponding request for digital components that includes the user group identifiers and optionally the contextual data. The DSP 150 selects one or more digital components from a set of digital components by filtering out digital components that do not have a corresponding user group identifier that matches one of the user group identifiers in the request for digital components. For example, at least a portion of the digital components distributed by the DSP 150 can have one or more user group identifiers for user groups related to the digital component. In a particular example, a digital component with content about a particular pair of shoes can have, as corresponding user group identifiers, identifiers for a "Shoes" group, a "Clothing" group, and "Footwear" group.

The DSP 150 selects digital components (414). In some implementations, the DSP 150 can further select digital components (for e.g., top-N digital components) by analyzing and scoring each of the one or more selected digital components. This scoring can be, for example, based on the contextual data, expected performance of the digital components, and/or additional information.

The DSP 150 transmits data for the one or more selected digital components to the SSP 170 (416). For example, the DSP 150 can respond to the request for digital components of the SSP 170 by transmitting the one or more selected digital components or data identifying the digital components (e.g., creative elements that include instructions for displaying the digital components). For each digital component, the DSP 150 can also generate or select a selection parameter for the digital component. The DSP 150 can then transmit, to the SSP 170, the selection parameter and data for the digital component. Each digital component (or its data) can include additional data, e.g., metadata that indicates the user group identifier corresponding to the digital component.

In some implementations, the DSP 150 can also select one or more digital components based on the contextual data independent of the user's group membership. These digital components can also be referred to as contextual digital components.

The SSP 170 selects a set of digital components (418). For example, after receiving the data for the one or more selected digital components from the DSP 150, the SSP 170 can review and select a set of digital components (for e.g., top-K digital components). For example, the SSP 170 can review the content and format of a digital component to ensure that it meets various criteria, e.g., does not include particular types of content, meets data and/or display size requirements, etc. In some implementations, the SSP 170 selects the digital components based at least in part on the selection parameters received from the DSPs 150. In such implementations, the SSP 170 can select the digital components having the highest selection parameters among the selection parameters received from the DSP 150.

The SSP 170 transmits a set of digital components to the client device 110 (420). For example, the SSP 170 after selecting the set of digital components (for e.g., top-K digital components), transmits the set of digital components (or the data for the digital components) to the application 112 executing on the client device 110 over the network 105. In some implementations, the SSP 170 can transmit along with the set of digital components, a set of selection parameters.

In some implementations, the list of digital components transmitted by the SSP 170 can be ordered based on the selection parameters. This enables the application 112 to select a digital component without knowing the actual selection parameters. The list of digital components can also include, for each digital component, data indicating the user group identifiers corresponding to the digital component. This enables the application 112 to filter out digital components for user groups of which the user is not a member.

In some implementations, the client device 110 sends multiple requests for digital components for each digital component slot. For example, the client device 110 can send a contextual request to the SSP 170 using steps 310-320. In this example, the request would not include the user group identifiers. Instead, the client device 110 can send one or more user group-based requests that each include one or more user group identifiers to the SSP 170, the MPC cluster 130, or another server. For example, using the MPC cluster 130 or another server separate from the SSP 170 and/or DSP 150 to manage the selection of digital components based on user group membership can better preserve user privacy. In this example, the client device 110 can receive a first set of one or more digital components selected based on the user group membership of the user (and optionally contextual data) and a second set of one or more digital components selected based on the contextual data without using the user group membership data.

The application 112 running on the client device 110 transmits an inference request (422). The application 112 executing on the client device after receiving the set(s) of digital components, can select a subset of digital components based at least in part on the predicted performance measures obtained by inferencing a respective predicted performance measure for each digital component (or at least one or more of the digital components) using the trained interaction machine learning model generated by the MPC cluster130. For example, the application 112 transmits an inference request for a digital component to MPC1. In other examples, the application 112 can transmit the inference request to MPC2. The application 112 can submit the inference request in response to receiving the set(s) of digital components. This request can be referred to an inference request to infer the respective predicted performance measure for the digital component. In some implementations, the application 112 generates and transmits an inference request for each digital component selected based on user group membership, e.g., without generating and sending an inference request for each digital component selected in response to a contextual request. In some implementations, the application 112 generates and transmits an inference request for all digital components included in the received set(s) of digital components.

In some implementations, the inference request for a digital component can include the one or more characteristics of the digital component. The inference request can also include contextual signals and the current user profile of the user of the client device 110, the inference parameter k (the number of nearest neighbors to fetch if the machine learning model is a k-NN model) and the model identifier for the machine learning model to be used for the inference. The inference request can also optionally include contextual signals and characteristics of the content page (for e.g., website 142) that the user of the client device 110 is currently viewing. Similar to steps 202 and 230 of FIG. 2, the application 112 can split the one or more characteristics of the digital component and the contextual signals. For example, the application 112 can generate corresponding shares of contextual signals ([contextual_signals$_{i,1}$] and [contextual_signals$_{i,2}$]), the one or more characteristics of the digital component ([digital_comp_char$_{i,1}$] and [digital_comp_chari,2]).

The application 112 generates a composite message C1_infer that includes the first share of the one or more characteristics of the digital component [digital_comp_char$_{i,j}$], the first share of the contextual signals [contextual_signals$_{i,1}$] for each of the digital components in the set, first share [P$_{i,1}$] of the current user profile P$_i$ and the model identifier. The application 112 encrypts the composite message using an encryption key of the computing system MPC1. Similarly, application 112 generates a composite message C2_infer of the second share of the one or more characteristics of the digital component [digital_comp_char$_{i,2}$], the second share of the contextual signals [contextual_signals$_{i,2}$], for each of the digital components in the set, the second share [P$_{i,2}$] of the current user profile P$_i$ and the model identifier. The application 112 encrypts the composite message using an encryption key of the computing system MPC2.

The application 112 can then select one of the two computing systems MPC1 or MPC2, e.g., randomly or pseudorandomly, for the query and transmit the inference request. If the application 112 selects computing system MPC1, the application 112 can send a single request to MPC1 with the composite message C1 and an encrypted version of the second composite message C2, e.g., PubKey-Encrypt(C2, MPC2).

The MPC cluster 130 generates the inference result (424). The computing systems MPC1 and MPC2 of the MPC cluster 130 can then use one of several possible machine learning techniques (e.g., binary classification, multiclass classification, regression, etc.) to determine, based on the interaction machine learning model (for e.g., k-NN model) a predicted performance measure for each of the one or more digital components. Depending on the machine learning model used, the performance measure can be a predicted interaction rate or a predicted conversion rate.

Similar to step 232 of the process 200, the computing systems MPC1 and MPC2 reconstruct the bit vectors. After the completion of reconstruction, computing system MPC1 has the first half of the overall bit vector for the given user profile and computing system MPC2 has the second half of the overall bit vector for the given user profile.

Each computing system MPC1 and MPC2 uses its half of the bit vector for the given user profile, one or more characteristics of digital components and contextual signals and its k-NN model to identify the k' nearest neighbors, where k'=α×k, where α is empirically determined based on actual production data and statistical analysis. For example α=3 or another appropriate number. The computing system MPC1 can compute a Hamming distance between the first half of the overall bit vector and the bit vectors of the k-NN model. The computing system MPC1 then identifies the k' nearest neighbors based on the computed Hamming distances, e.g., the k' nearest neighbors having the lowest Hamming distances. In other words, the computing system MPC1 identifies a set of nearest neighbor user profiles, one or more characteristics of digital components and contextual signal based on a share of a given user profile, one or more characteristics of digital components and contextual signal and the k-NN model.

The predicted performance measure can be based on the k nearest neighbor profiles and their associated labels. The determination is also based on the aggregation function used and any aggregation parameters for that aggregation function. The aggregation functions can be chosen based on the nature of the machine learning problem, for example binary classification, regression (e.g., using arithmetic mean or root mean square), multiclass classification, and weighted k-NN. Each way of determining a predicted performance measure can include different interactions between the MPC cluster 130 and the application 112 running on the client 110, as described in more detail below.

For example, if the k-NN model is an interaction machine learning model and the aggregation function counts the number of neighbors that interacted with the digital component, the predicted performance can be X/k where X is the number of neighbors that interacted with the digital component among the k neighbors. Similarly, if the k-NN model is a conversion machine learning model and the aggregation function counts the number of neighbors that converted by performing a target action on the second content page, the predicted performance can be X/k where X is the number of neighbors that converted among the k neighbors. Continuing with this current example, the aggregate function can also find the average of a conversion parameter (for e.g., the amount paid by the user while performing the target action) of the k neighbors thereby determining an average value of the conversion parameter.

If the k-NN model is a regression model, the label associated with each user profile P will be numerical. For example the label can be 0 or 1 that refers to an interaction or a non-interaction event. Within the k nearest neighbors found, the MPC cluster 130 calculates the mean (result) of the label values. In some implementations, the result can be used as a performance measure or can be used to calculate the performance measure. For example, the result can be used as an input parameter of a function that can generate a performance measure based on the result.

If the machine learning model is a conversion model, the steps of the inference process remain the same. Similar to the interaction model, the computing systems MPC1 and MPC2 of the MPC cluster 130 can then use one of several possible machine learning techniques (e.g., binary classification, multiclass classification, regression, etc.) to determine, based on the conversion machine learning model (for e.g., k-NN model) a predicted performance measure indicating the likelihood of a user converting after a digital component is displayed to the user.

The MPC cluster 130 transmits the inference result to the application 112 (426). In this example, the computing system MPC1 that received the query sends the inference result to the application 112. The inference result can indicate a predicted performance measure or a classification label for each of the one or more digital components. To prevent any of the MPC systems to have complete access to the inference result, the computing system MPC1 can compute a share of the inference result based on the k-NN model generated using its share of the bit vectors and the computing system MPC2 can compute another share of the inference result based on a k-NN model generated using the other share of the bit vectors. The computing system MPC2 can provide an encrypted version of its share to the computing system MPC1, where the share is encrypted using a public key of the application 112. The computing system MPC1 can provide, to the application 112, its share of the inference result and the encrypted version of computing system MPC2's share of the user group result. The application 112 can decrypt computing system MPC2's share and calculate the inference result from the two shares. For example, the application 112 can calculate the inference result by adding or averaging the results from MPC1 and MPC2, depending on the secret sharing algorithm used. In some implementations, to prevent computing system MPC1 from falsifying computing system MPC2's result, computing system MPC2 digitally signs its result either before or after encrypting its result using the public key of the application 112. The application 112 verifies the computing system MPC2's digital signature using the public key of MPC2.

The client device 110 selects a given digital component from the filtered subset of digital components (428). In some implementations, the application 112 can select based on the inference results (for e.g., a predicted performance of interacting with a digital component and the predicted performance of conversion for a digital component), one or more digital components for display in the digital component slots from the set. For example, assume that the website 142 has one digital component slot. The selection process can include selecting a digital component that has the highest predicted performance measure indicating the highest likelihood of being interacted with when displayed to the user.

In another example, the application 112 can use the predicted performance measure for a digital component to determine or adjust a selection value for the digital component. The application 112 can then select, as the given digital component, the digital component having the highest selection value. For example, the application 112 or the DSP 150 responsible for selecting digital components, can select a monotonic function F parameterised by the predicted performance measures of the interaction machine learning model and/or the conversion machine learning model to compute a selection value. In some implementations, the monotonic function F can take the following form: $F(predicted\_performance\_measure)=X+ R*predicted\_performance\_measure$. In this relationship, the parameter X is a lower limit of the selection value and the parameter R is a value between zero and one indicating the rate of increase in the selection value based on the predicted performance measure.

In some implementations, the selection of digital components is not solely based on the predicted performance measures of the digital components. For example, the application 112 can take into consideration, the predicted performance measure of the digital component along with the contextual properties of the digital components, an agreement or a condition related to the digital components set by the component provider (for e.g., a value indicating a monetary value received by the SSP to display digital components) or user defined rules of inclusion or exclusion of digital components.

The application 112 displays the given digital component (430). For example, application 112 can display the selected digital component with the electronic resource of the publisher 140.

FIG. 5 is a flow diagram of an example process 500 of uploading the user profile, the one or more characteristics of the digital component, the contextual signals, the model identifier, and data indicating whether the event is an interaction event or a non-interaction event. Operations of the process 500 can be implemented, for example, by the client device 110, an SSP 170, one or more DSPs 150, and a publisher 140. Operations of the process 500 can also be implemented as instructions stored on one or more computer readable media which can be non-transitory, and execution of the instructions by one or more data processing apparatus can cause the one or more data processing apparatus to perform the operations of the process 500

The application 112 receives a first content page that includes a digital component and a script (510). For example, the user of the client device 110 can use a browser to visit a website 142 by specifying a reference (e.g., URL). In another example, the user of the client device 110 can use a web browser to submit a search query to the search system that identifies websites by crawling and indexing the websites (e.g., indexed based on the crawled content of the websites). In response, the search system identifies the websites in the form of search results and returns the search results to the client device 110 in the search results page. After viewing the search results, the user of the client device 110 can select and/or click the search result corresponding to the website 142. In yet another example, the user can launch a native application that requests content from a publisher 140 of the application.

The script detects an occurrence of an event (520). For example, the application 112 can execute the script to monitor for user interaction with the digital component. Examples of such interaction signals detected by the script can include the coordinates of the location where the interaction was detected (e.g., the point of contact on a touch-sensitive screen) and the amount of time for which the contact was performed.

The application receives a request from the script to upload a user profile (530). For example, in response to detecting user interaction with a digital component, the script of the digital component generates a request to upload the user profile by passing a user profile request data element to the application 112. The request to upload user profile can be of the following form UploadUserProfile(Model Identifier, Creative Level Signals, Clicked, Content Platform Domain, Digital Signature).

The application 112 obtains the user profile request data element (540). For example, in response to the request to upload the user profile of the user, the application 112 obtains user request profile data element $M_{upload}$ that includes the model identifier for the machine learning model and one or more characteristics of the digital component, e.g., the creative level signals used by the SSP and/or the DSP to select digital components for the application 112, one or more characteristics of the first content page, the domain of the content platform and a digital signature of the contents of the token.

The application 112 obtains the user profile of the user of the client device (550). For example, the application 112 selects the user profile of the user for a machine learning model implemented by the MPC cluster 130 for scoring digital components. Based on the particular implementation, the application 112 could have already used a pseudorandom function PRF($P_i$) to generate two shares $\{[P_i, 1],[P_{i,2}]\}$ of the user profile prior to receiving the user profile request data element. However, if the shares of user profiles were not generated before, the application 112 can generate shares of user profiles.

The application 112 obtains the contextual signals that were provided to the content platforms (560). For example, the application 112 obtains the contextual data (also referred to as contextual signals) that was previously included in the request for digital components. The contextual data can include, for example, a resource locator for the resource, e.g., a Universal Resource Locator (URL) for a web page or Universal Resource Identifier (URI) for application content, a language (e.g., the language in which content is displayed by the application rendering the content) and/or coarse geographic location information indicating a coarse location of the client device 110. Other contextual data can also be used.

The application transmits data to the machine learning platform (570). For example, the application 112 generates a composite message C1 of the first share [$P_{i,1}$] of the user profile $P_i$, the first share of the one or more characteristics of the digital component [digital_comp_char$_{i,1}$], the first share of the contextual signals [contextual_signal$_{i,1}$], data indicating whether the event is an interaction event or a non-interaction event and the model identifier. The application 112 encrypts the composite message using an encryption key of the computing system MPC1. Similarly, application 112 generates a composite message C2 of the second share [$P_{i,2}$] of the user profile $P_i$, the second share of the one or more characteristics of the digital component [digital_comp_char$_{i,2}$], the second share of the contextual signals [contextual_signals$_{i,2}$], data indicating whether the event is an interaction event or a non-interaction event and the model identifier. The application 112 encrypts the composite message using an encryption key of the computing system MPC2. These functions can be represented as PubKeyEncrypt(C1, MPC1) and PubKeyEncrypt(C2, MPC2), where PubKeyEncrypt represents a public key encryption algorithm using the corresponding public key of MPC1 or MPC2.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by a client device, a first content page comprising a digital component comprising computer-readable instructions for initiating uploads of user profiles for use in training machine learning models;
presenting, by the client device, the digital component with the first content page;
receiving, by an application running on the client device, a request generated based on the computer-readable instructions to upload a user profile of a user of the client device to a machine learning platform, wherein the computer-readable instructions initiate the request in response to detecting of an occurrence of an event related to interaction or non-interaction with the digital component presented with the first content page within a specified time frame, wherein the event is an interaction event if a user interaction with the digital component is detected within the specified time frame, and wherein the event is a non-interaction event if user interaction with the digital component is not detected within the specified time frame; and
in response to receiving the request:
obtaining, by the application, a user profile request data element comprising a model identifier for a machine learning model and one or more characteristics of at least one of the digital component or the first content page;
obtaining, by the application, a user profile for a user of the client device;
obtaining, by the application and for use in training the machine learning model, contextual signals that were provided to one or more content platforms to enable the one or more content platforms to select digital components for presentation with the first content page; and
transmitting, by the application and to the machine learning platform, a set of data comprising the user profile, the one or more characteristics, the contextual signals, the model identifier, and data indicating whether the event is the interaction event or the non-interaction event.

2. The computer-implemented method of claim 1, wherein the user profile request data element comprises a token received from a content platform that provided the digital component, the token comprising (i) a set of content comprising the model identifier, the data indicating the one or more characteristics, a domain of the content platform, and (ii) a digital signature of the set of content generated using an encryption key of the content platform.

3. The computer-implemented method of claim 2, further comprising verifying, by the application, the digital signature prior to transmitting the set of data to the machine learning platform.

4. The computer-implemented method of claim 1, wherein the event comprises an interaction event, the method further comprising, in response to detecting the occurrence of the interaction event, storing, at the client device, the contextual signals, the one or more characteristics of the digital component, and the user profile.

5. The computer-implemented method of claim 4, further comprising:
in response to detecting the occurrence of the interaction event, accessing, by the client device, a second content page provided by a second content provider different from a first content provider that provided the first content page, wherein the second content page comprises a tag comprising computer-readable code;
receiving, from the tag, a request for the contextual signals, the one or more characteristics of the digital component and the user profile;
encrypting, by the application, the contextual signals, the one or more characteristics of the digital component and the user profile; and
transmitting, to a content platform that provided the digital component, the encrypted contextual signals, the encrypted one or more characteristics of the digital component, and the encrypted user profile.

6. The computer-implemented method of claim 5, further comprising:
detecting, by the computer-readable code of the tag, a conversion event; and
transmitting, by the computer-readable code of the tag, a conversion notification for the conversion event to the content platform.

7. The computer-implemented method of claim 1, further comprising:

for each of one or more digital components:

sending, by the application, an inference request for the digital component to the machine learning platform, wherein the inference request comprises one or more of the user profile, the contextual signals, or characteristics of the first content page;

receiving, from the machine learning platform, a predicted performance measure for the digital component, wherein the predicted performance measure is based on the user profile and one or more trained machine learning models trained by the machine learning platform;

determining, based on the predicted performance, a selection value for the digital component; and selecting a given digital component for display at the client device based at least on the selection value for each of the one or more digital components.

8. The computer-implemented method of claim 7, wherein the inference request for the digital component to the machine learning platform further comprises the one or more characteristics of the digital component, the characteristics of the first content page and the contextual signals.

9. The computer-implemented method of claim 7, wherein the predicted performance comprises one of a predicted user interaction rate for the digital component, a predicted conversion rate, or a predicted conversion value for the digital component.

10. The computer-implemented method of claim 7, wherein the predicted performance is based on a performance of the digital component for k nearest neighbor profiles, that are determined, based on the one or more machine learning models, to be k most similar user profiles to the user profile for the user of the client device.

11. The computer-implemented method of claim 1, further comprising:

receiving, from a first multi-party computation (MPC) computer of the machine learning platform, a first secret share of an inference result for a first digital component;

receiving, from each of one or more second MPC computers of the machine learning platform, a second secret share of the inference result for the digital component;

determining, based on the first secret share and each second secret share, a predicted performance measure for the digital component represented by the inference result;

selecting the digital component for display at the client device based on the predicted performance measure; and displaying the digital component.

12. The computer-implemented method of claim 5, wherein the machine learning platform comprises two or more multi-party computation (MPC) computers that use a secure MPC process to train a machine learning model to predict a performance measure of the digital component using the encrypted contextual signals, the encrypted one or more characteristics of the digital component, the encrypted user profile and data received from client devices of one or more additional users.

13. The computer-implemented method of claim 12, wherein the two or more MPC computers train the machine learning model without accessing the encrypted contextual signals, the encrypted one or more characteristics of the digital component, or the encrypted user profile in cleartext.

14. The computer-implemented method of claim 1, wherein obtaining, by the application, a user profile for a user of the client device comprises selecting, by the application, the user profile based at least in part on the model identifier.

15. The computer-implemented method of claim 1, wherein:

obtaining the user profile comprises generating, by the application, a first secret share of the user profile and a second secret share of the user profile; and transmitting the set of data comprises transmitting the first secret share to a first computing system of the machine learning platform and transmitting the second secret share to a second computing system.

16. A system comprising:

one or more processors; and one or more memories having stored thereon computer readable instructions configured to cause the one or more processors to perform operations comprising:

receiving, by a client device, a first content page comprising a digital component comprising computer-readable instructions for initiating uploads of user profiles for use in training machine learning models;

presenting, by the client device, the digital component with the first content page;

receiving, by an application running on the client device, a request generated based on the computer-readable instructions to upload a user profile of a user of the client device to a machine learning platform, wherein the computer-readable instructions initiate the request in response to detecting of an occurrence of an event related to interaction or non-interaction with the digital component presented with the first content page within a specified time frame, wherein the event is an interaction event if a user interaction with the digital component is detected within the specified time frame, and wherein the event is a non-interaction event if user interaction with the digital component is not detected within the specified time frame; and in response to receiving the request:

obtaining, by the application, a user profile request data element comprising a model identifier for a machine learning model and one or more characteristics of at least one of the digital component or the first content page;

obtaining, by the application, a user profile for a user of the client device;

obtaining, by the application and for use in training the machine learning model, contextual signals that were provided to one or more content platforms to enable the one or more content platforms to select digital components for presentation with the first content page; and transmitting, by the application and to the machine learning platform, a set of data comprising the user profile, the one or more characteristics, the contextual signals, the model identifier, and data indicating whether the event is the interaction event or the non-interaction event.

17. The system of claim 16, wherein the user profile request data element comprises a token received from a content platform that provided the digital component, the token comprising (i) a set of content comprising the model identifier, the data indicating the one or more characteristics, a domain of the content platform, and (ii) a digital signature of the set of content generated using an encryption key of the content platform.

18. The system of claim 16, wherein the event comprises an interaction event and wherein the operations comprise, in response to detecting the occurrence of the interaction event, storing, at the client device, the contextual signals, the one or more characteristics of the digital component, and the user profile.

19. The system of claim 18, wherein the operations comprise:

in response to detecting the occurrence of the interaction event, accessing, by the client device, a second content page provided by a second content provider different from a first content provider that provided the first content page, wherein the second content page comprises a tag comprising computer-readable code;

receiving, from the tag, a request for the contextual signals, the one or more characteristics of the digital component and the user profile;

encrypting, by the application, the contextual signals, the one or more characteristics of the digital component and the user profile; and transmitting, to a content platform that provided the digital component, the encrypted contextual signals, the encrypted one or more characteristics of the digital component, and the encrypted user profile.

20. A non-transitory computer readable medium storing instructions that, when executed by one or more data processing apparatuses, cause the one or more data processing apparatuses to perform operations comprising:

receiving, by a client device, a first content page comprising a digital component comprising computer-readable instructions for initiating uploads of user profiles for use in training machine learning models;

presenting, by the client device, the digital component with the first content page;

receiving, by an application running on the client device, a request generated based on the computer-readable instructions to upload a user profile of a user of the client device to a machine learning platform, wherein the computer-readable instructions initiate the request in response to detecting of an occurrence of an event related to interaction or non-interaction with the digital component presented with the first content page within a specified time frame, wherein the event is an interaction event if a user interaction with the digital component is detected within the specified time frame, and wherein the event is a non-interaction event if user interaction with the digital component is not detected within the specified time frame; and in response to receiving the request:

obtaining, by the application, a user profile request data element comprising a model identifier for a machine learning model and one or more characteristics of at least one of the digital component or the first content page;

obtaining, by the application, a user profile for a user of the client device;

obtaining, by the application and for use in training the machine learning model, contextual signals that were provided to one or more content platforms to enable the one or more content platforms to select digital components for presentation with the first content page; and transmitting, by the application and to the machine learning platform, a set of data comprising the user profile, the one or more characteristics, the contextual signals, the model identifier, and data indicating whether the event is the interaction event or the non-interaction event.

* * * * *